United States Patent Office 3,287,545
Patented Nov. 22, 1966

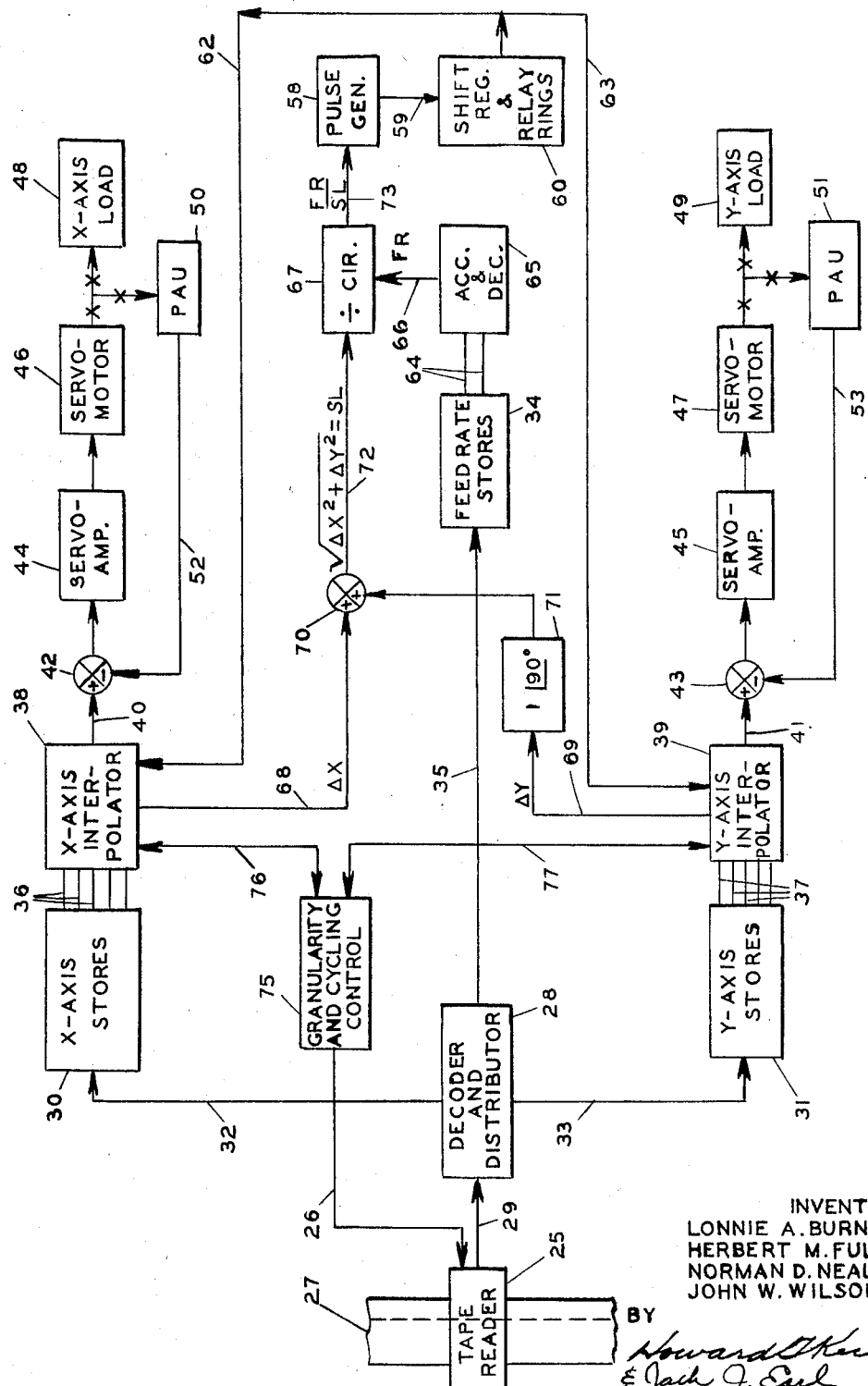

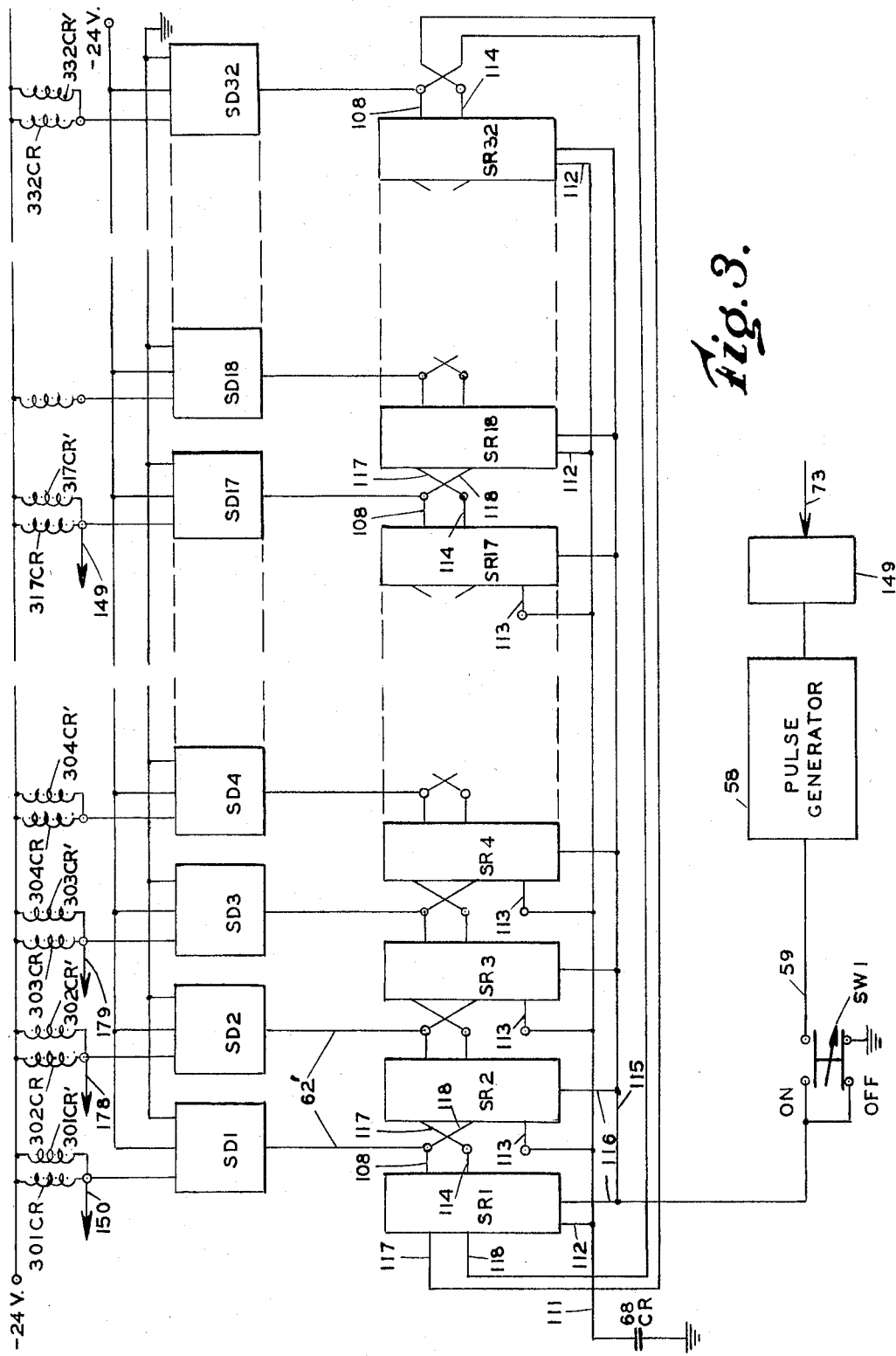

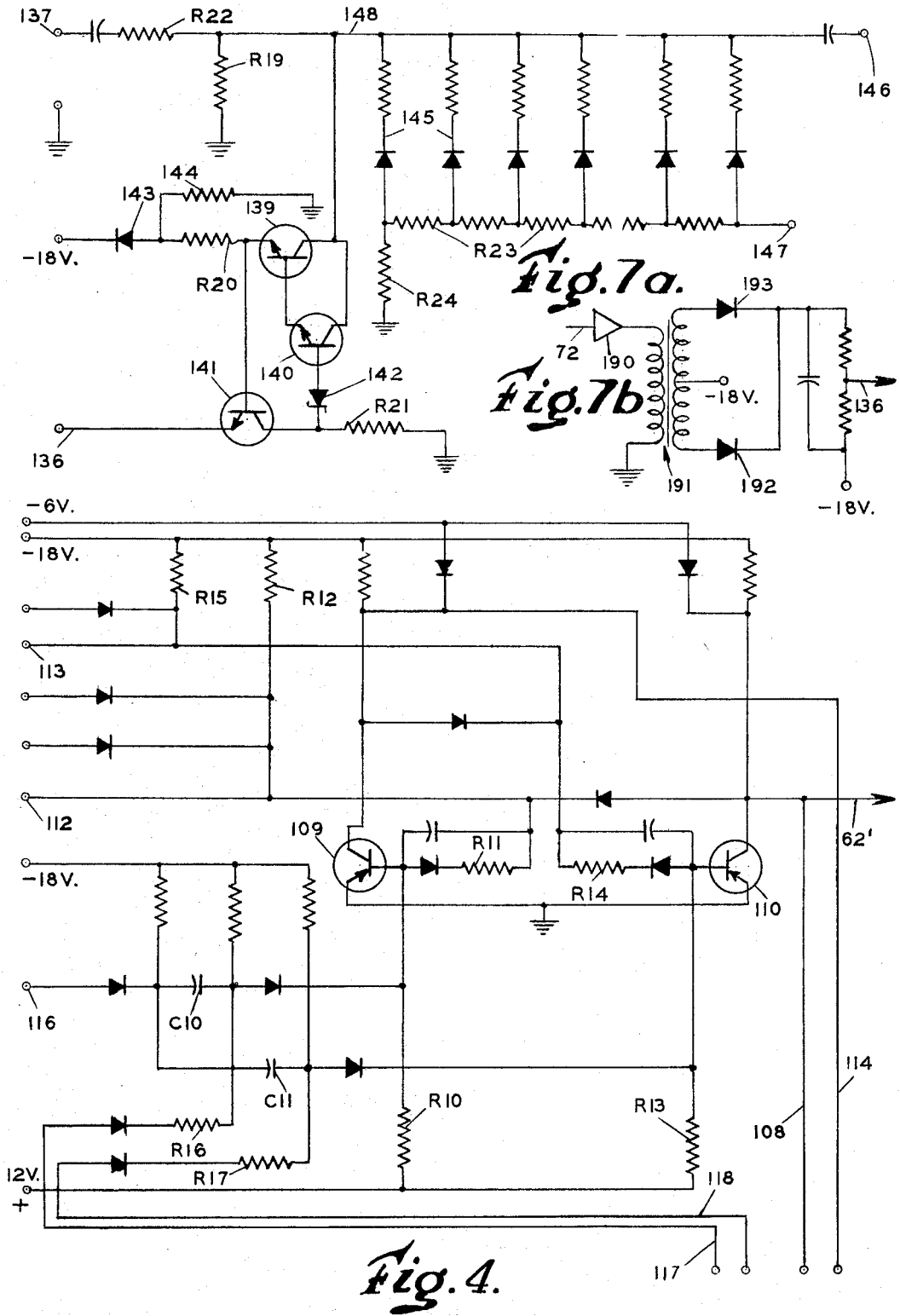

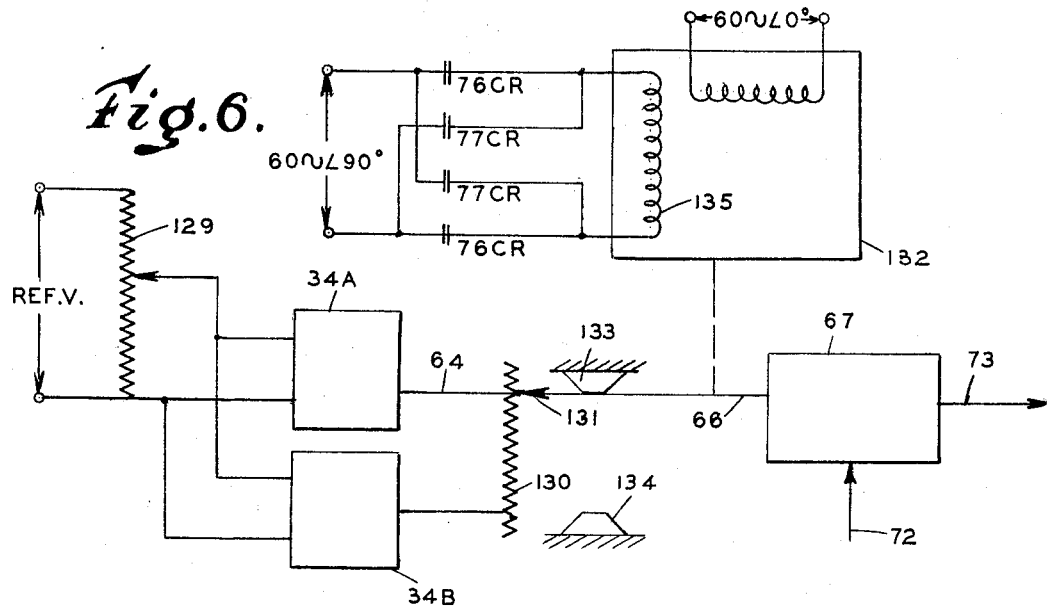
Fig. 6.
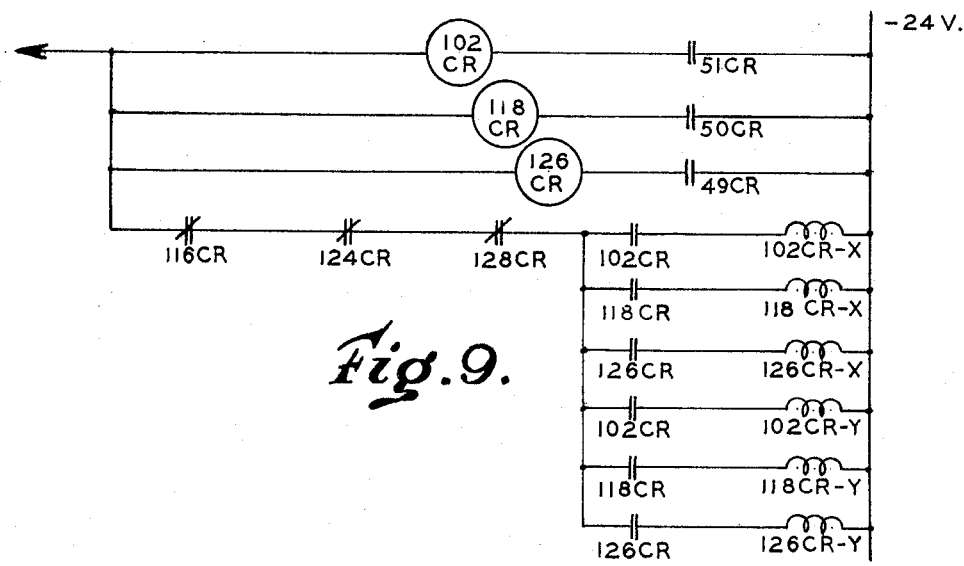
Fig. 8.
Fig. 9.

1

3,287,545
AUTOMATIC CONTROL SYSTEM
Lonnie A. Burnett, Cincinnati, Ohio, Herbert M. Fuldner, Fort Thomas, Ky., and Norman D. Neal and John W. Wilson, Cincinnati, Ohio, assignors to The Cincinnati Milling Machine Co., Cincinnati, Ohio, a corporation of Ohio
Filed Feb. 26, 1962, Ser. No. 175,400
24 Claims. (Cl. 235—151.11)

This invention relates to a control system in which a movable member is automatically caused to follow a predetermined contour and, more particularly, to improvements in the interpolating unit for such a system and in the controls relating thereto which determine movements of the member between relatively widely spaced values of either a linear or a curvilinear function corresponding to the contour to be produced.

One of the difficulties encountered with present day control systems employing analog interpolation of the input data is their inability to effect instantaneous changes in the speed of the interpolator. When such a system is applied to a machine tool, for example, it is unable to maintain a uniform feed rate of the tool relative to the workpiece when data representing different lengths of spans are fed into the interpolator. The interpolators presently being used in analog control systems are customarily rotary devices driven by electric or hydraulic servomotors which, of necessity, possess considerable inertia. Hence, it is impossible to change the speed of these units instantaneously and as a result, optimum performance of the control system cannot be realized. This problem has been recognized for a number of years but during all this time there has been no solution proposed which would eliminate the lag in the response of the interpolator resulting from its intrinsic inertia.

Accordingly, it is an object of the present invention to provide an interpolator for a contouring control system which is essentially inertialess and therefor capable of undergoing substantially instantaneous changes in speed. This has been accomplished through the use of an electrical commutating device which is completely inertialess except for the small mass contained in the moving contacts of the reed type relays used therein.

Another object of the invention is to provide a multistage interpolator having static cycling control means incorporated in the switching circuits between adjoining stages thereof as well as in the switching circuit for the output stage.

Another object of the invention is to provide a multistage interpolator having an automatic granularity control which is responsive to the character of the input data and which is incorporated in the switching connections between adjacent stages of the interpolator.

Another object of the invention is to provide automatic means for causing the interpolator speed to vary inversely as the length of the sub-spans so as to maintain the feed rate constant.

Another object of the invention is to provide automatic means for blending the programmed feed rate between adjoining spans from one value to the next so as to avoid a step-function input to the drive system.

With these and other objects in view, which will become apparent from the following description, the invention includes certain novel features of construction and combinations of parts, the essential elements of which are set forth in the appended claims, and a preferred form or embodiment of which will hereinafter be described with reference to the drawings which accompany and form a part of this specification.

2

FIG. 1 is a block diagram of a numerical control system incorporating the present invention.

FIGS. 2a, 2b, 2c and 2d together comprise a wiring diagram for an interpolator.

FIG. 3 is a block diagram of a shift register.

FIG. 4 is a wiring diagram of a shift register stage.

FIG. 6 is a schematic view illustrating an acceleration-deceleration unit.

FIG. 7a is a wiring diagram of a dividing circuit.

FIG. 7b is a wiring diagram of a rectifier circuit.

FIG. 8 is a partial wiring diagram of a control circuit for the second stages of the interpolators.

FIG. 9 is a partial wiring diagram of a control circuit for the first stages of the interpolators.

Figure 12A:
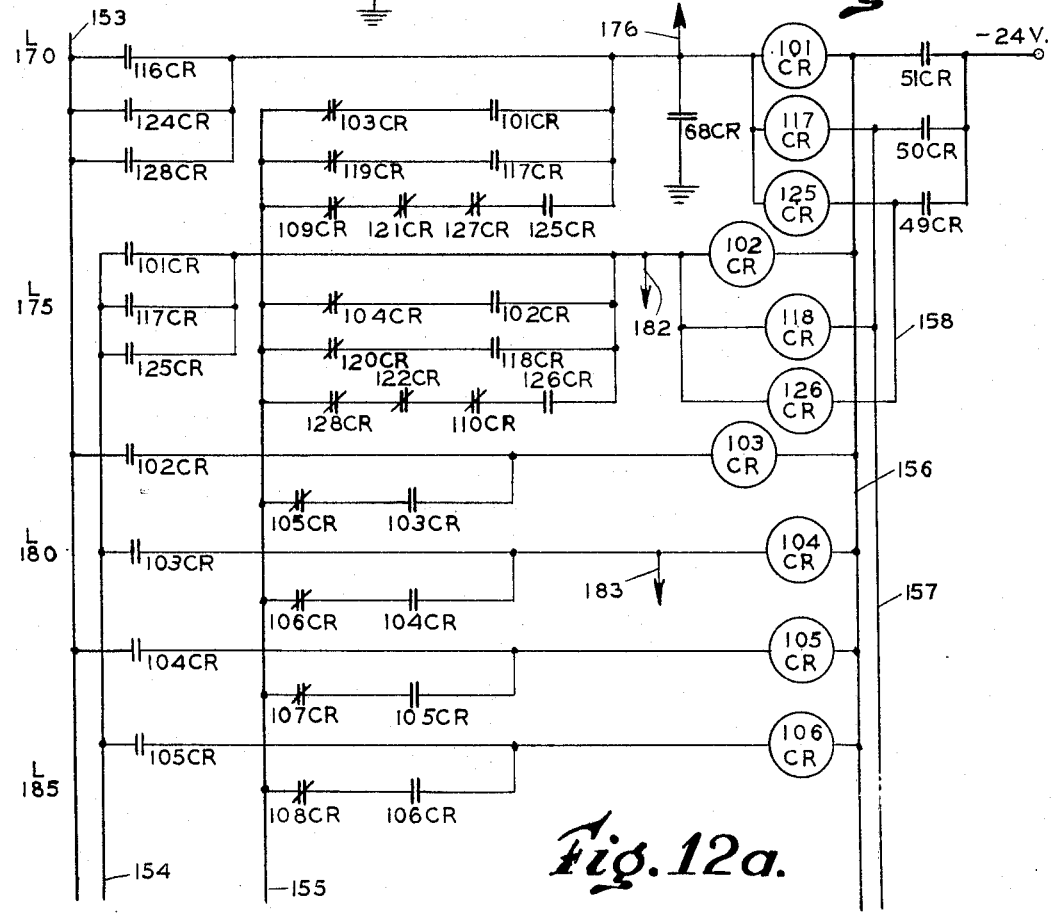
Figure 12B:
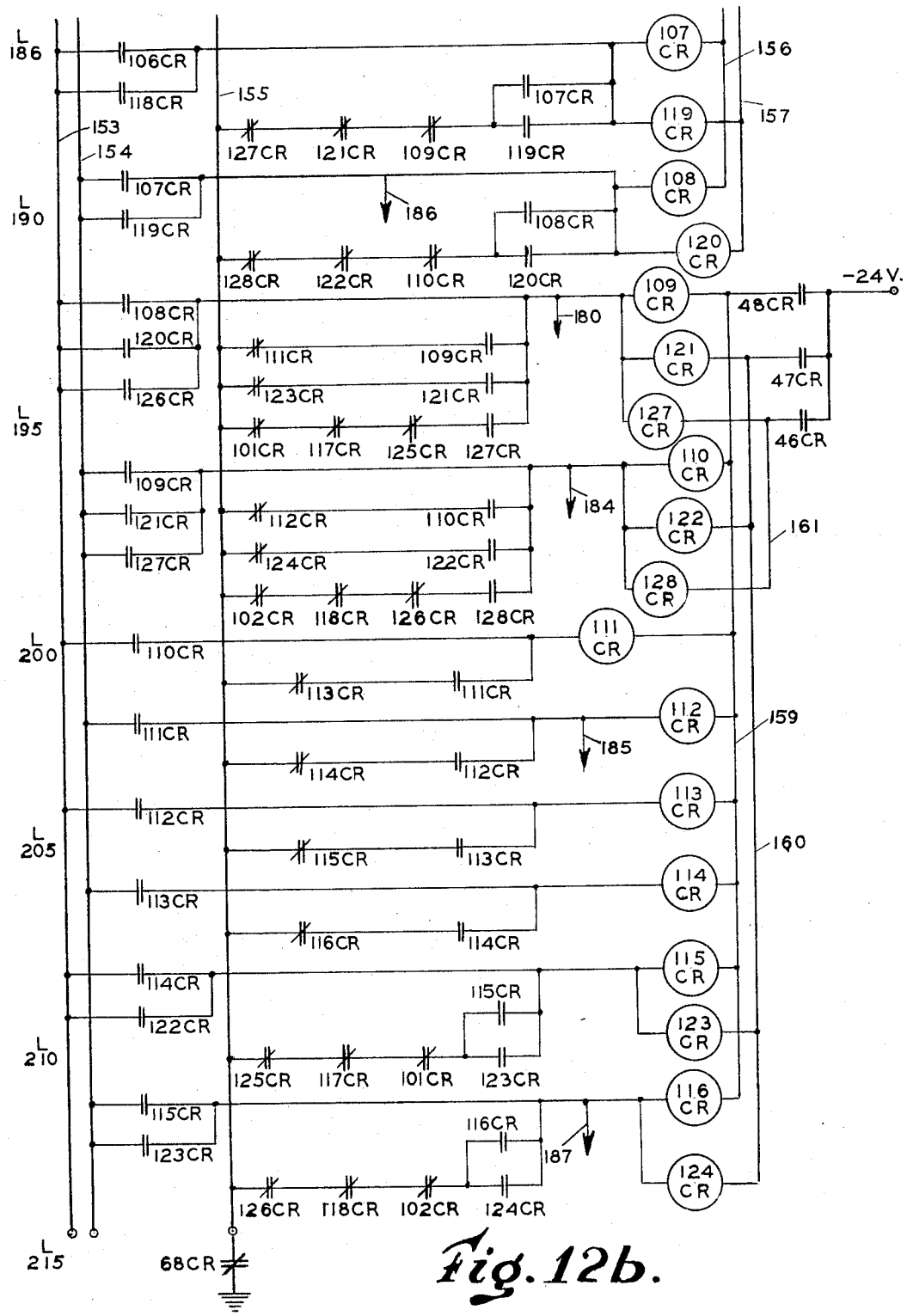

FIGS. 12a and 12b together comprise a wiring diagram of relay rings for control of the first stages of the interpolators.

Figure 13:
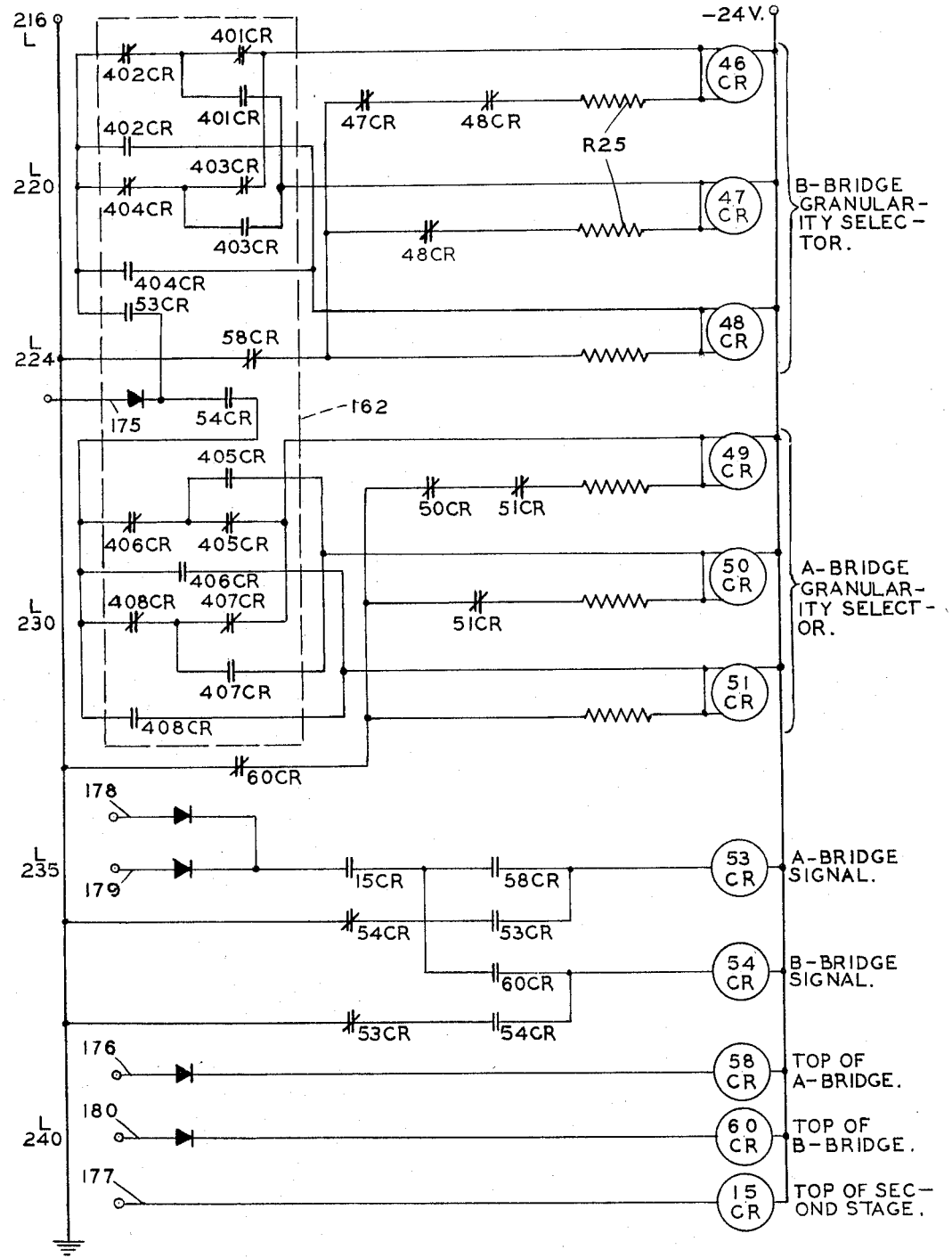

FIG. 13 is a wiring diagram for the granularity selection control circuit.

Figure 14A:
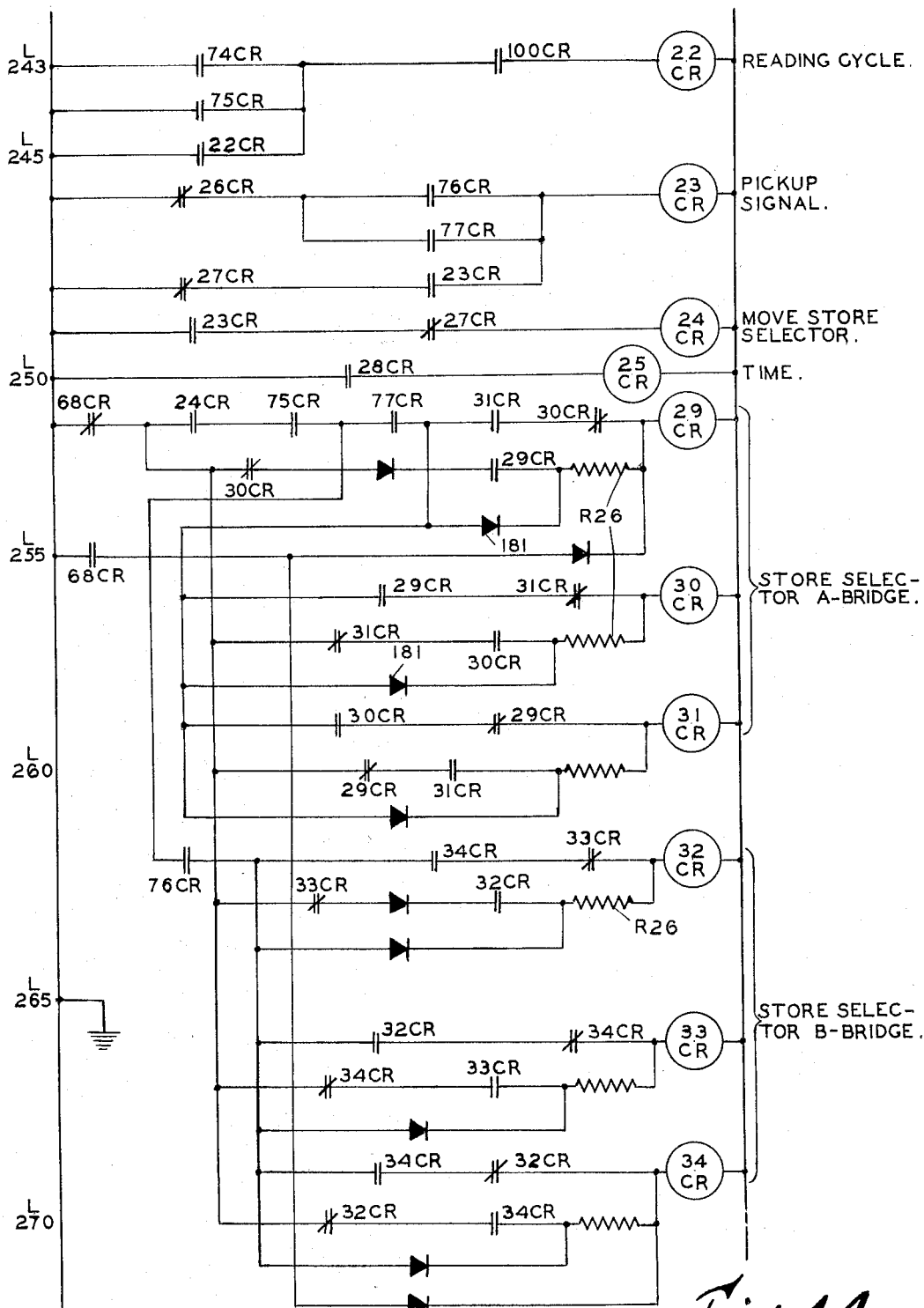
Figure 14B:
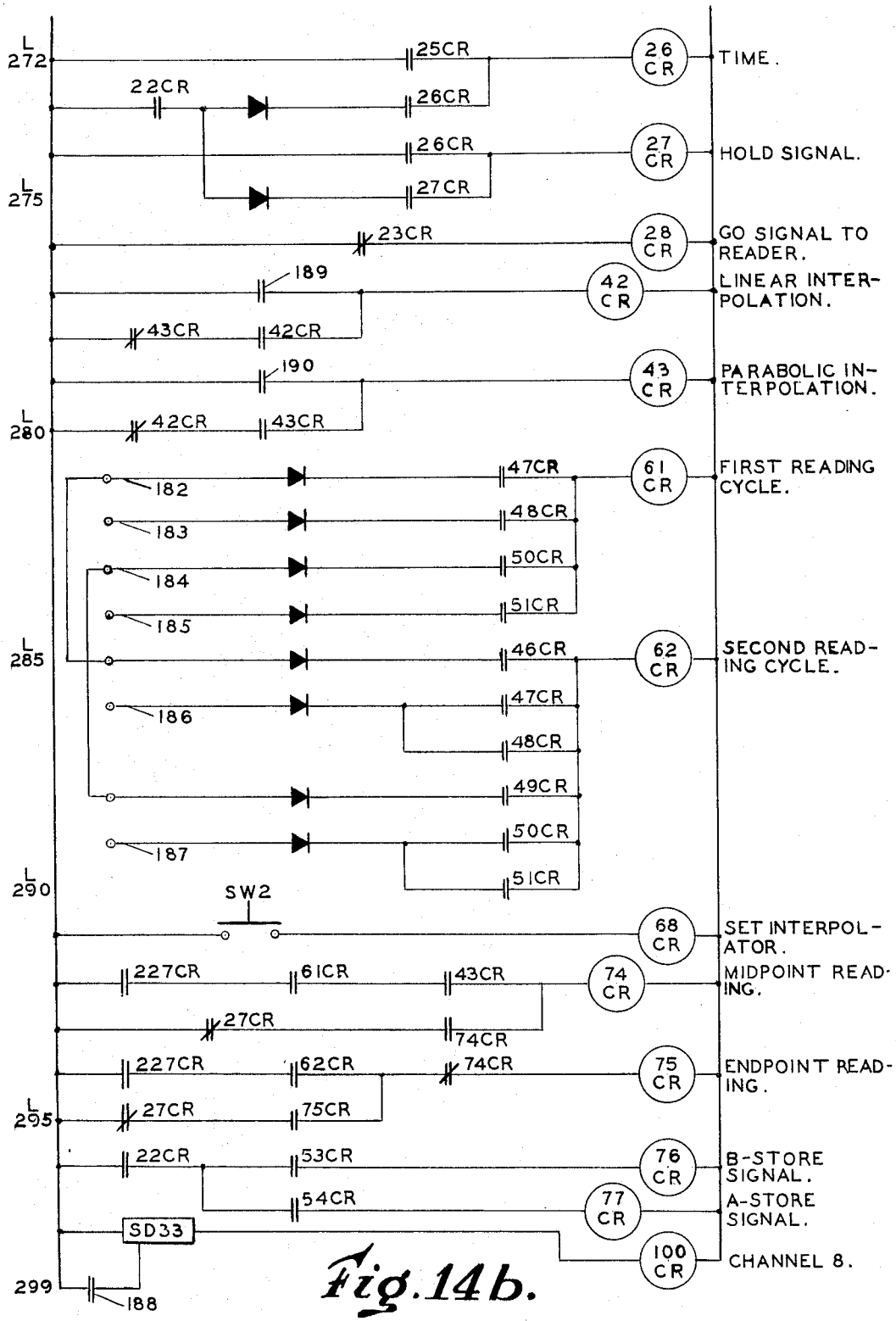

FIGS. 14a and 14b together comprise a wiring diagram for the store selector and tape reader control circuits.

In order that the invention may be clearly understood in relation to a typical control system to which it might advantageously be applied, reference is made to the block diagram of a tape controlled contouring system for a machine tool shown in FIG. 1. In this diagram, the invention is shown applied to a 2-axes contouring system, the axes of movement under control being referred to herein as the X-axis and the Y-axis. It will be realized, of course, that the present invention might with equal facility be applied to more than two axes of control should this be found desirable.

In the diagram there is shown a tape reader 25 of known construction which receives "read" signals from a line 26 and transmits data from the tape 27 to a decoder and distributer unit 28 via line 29. The decoder and distributer unit 28, which is also of known design, translates the numerical input data into suitable form for assimilation by the various stores of the system and distributes it to the stores either in a predetermined sequence (tab sequential system), or else in accordance with instructions on the tape (word address system). The input data from the tape representing the programmed points of each span on the contour being machined, is supplied to the X-axis stores 30 and the Y-axis stores 31 by means of lines 32 and 33, respectively. Input data as to the rate at which the tool is to be moved along the workpiece is furnished to the feed rate stores 34 by way of line 35. In accordance with known procedures, the numerical data supplied to the above-mentioned stores is converted into analog form, e.g., an alternating current voltage having an amplitude ratio proportional to the numerical value of the data supplied thereto. In the system chosen to illustrate the present invention, there are five X-axis stores 30 and five Y-axis stores 31 which are filled with data representing the X and Y coordinates of five successive points along the curve being produced. The five analog voltages from the stores 30 and 31 are transmitted by conductors 36 and 37 to X-axis and Y-axis interpolators 38 and 39, respectively.

The system thus far described is similar to that shown in U.S. Patent No. 2,929,555 granted March 22, 1960, on an application filed by R. E. Spencer and F. C. Wolfendale, and reference is made to that patent for a more complete disclosure of the type of numerical control system presently being discussed.

In the apparatus shown in FIG. 1 herein, and also in the Spencer et al. patent, the analog voltages from the stores 30 and 31 are interpolated three at a time and the smoothly varying voltages from the interpolators are delivered by conductors 40 and 41 to differencing circuits 42 and 43. The resultant voltages from the circuits 42 and 43 are fed into X-axis and Y-axis servo amplifiers 44 and 45 and thence to servo motors 46 and 47 which drive the X and Y slides 48 and 49. Connected with the slides for synchronous movement therewith are position analog units 50 and 51 which, in Patent No. 2,929,555, are represented as potentiometers, and from which feedback voltages are transmitted by conductors 52 and 53 to the differencing circuits 42 and 43. Hence, the slides 48 and 49 will be caused to follow the command voltages produced by the interpolators and thereby produce the contour represented by the input data.

As indicated in the above-mentioned patent, the X and Y-axis interpolators include rotary switches driven by an electric motor which, as pointed out earlier herein, causes the performance of the system to suffer due to the intrinsic inertia of the interpolator and its drive. In the present system, the X and Y-axis interpolators are driven by a pulse generator 58 which transmits electrical pulses through a line 59 to a shift register and relay rings 60. This unit includes a plurality of identical flip-flop stages, with the first stage of the register being connected to the last stage for an end around carry which will enable cyclic operation thereof in response to the shift pulses received from line 59. Each stage of the shift register is connected with a solenoid driver which actuates reed relays in the interpolator output switching circuits through cables 62 and 63. Hence, as the shift register is cycled, the output taps of each of the final interpolator stages will be sequentially connected to the output conductors 40 and 41 to produce the smoothly varying output voltages required to drive the slides 48 and 49. The relay rings in the unit 60 are cycled at a predetermined rate with respect to the cycling of the shift register and control the switching between the stages of the interpolator.

The feed rate along the path produced by the combined movement of the slides is determined by the analog output voltage of the feed rate stores 34. Two separate feed rate stores are provided so that they may alternately be filled with the feed rate data pertaining to adjacent spans of input information. The analog voltages of the feed rate stores are applied by conductors 64 to opposite ends of an impedance element contained in an acceleration-deceleration unit 65. At the end of each span and the beginning of the next, this element is scanned to produce a feed rate voltage which changes smoothly from a preexisting value to a new value within a fixed time interval which is shorter than the time required for traversal of the shortest span.

The feed rate analog voltage is then transmitted by a conductor 66 to an analog computer circuit 67 where it is divided by the magnitude of the vectorial sum of the component sub-span lengths, delta X and delta Y. Voltages proportional to the sub-span lengths are derived from windings on the transformer cores of the output stages of the X- and Y-axis interpolators and transmitted by conductors 68 and 69 to a summing network 70. To effect vectorial addition of the voltages it is necessary first to phase shift one of them by 90° as is indicated by the phase-shift network 71. The voltage representing the magnitude of the vectorial sum, SL, is then rectified and transmitted to the dividing circuit 67 which computes the quotient $FR/SL$ and delivers a rectified voltage proportional thereto to the pulse generator 58 through a conductor 73. The generator 58 is essentially an oscillator whose frequency is proportional to the magnitude of the input voltage from conductor 73. The waveform of the output from the oscillator is suitably shaped to provide drive pulses for the shift register 60. It will thus be seen that the feed rate is maintained constant irrespective of changes in the span length SL since the rate at which the interpolators are pulsed by the generator 58 is inversely proportional to the span length. In other words, the feed rate is maintained equal to the product of the span length times the pulse rate which product is a constant.

Provision is made in the present system to enable the granularity of the interpolated output voltages to be changed in accordance with the span length information supplied to the interpolators, i.e., in accordance with the difference in amplitude between pairs of X- and Y-axis endpoint voltages supplied from the stores. For this purpose, a granularity and cycling control unit 75 is connected with the interpolators by lines 76 and 77. This unit includes circuits for sensing the magnitude of the difference between pairs of X- and Y-axis endpoint voltages and selecting either the X-axis voltage or Y-axis voltage, which ever is larger, for controlling the granularity. It also includes circuitry for simultaneously and sequentially connecting the stores for both axes with their interpolators so as to maintain the dual interpolation process synchronized. Also, as indicated by the line 26, the tape reader is operated under the control of the store switching circuitry to read the next block of information from the tape. This data is then delivered to the decoder and distributor 28 which in turn distributes it to the stores 30, 31 and 34. Hence, the stores are continuously filled with information at the same rate at which it is being used so that the system operates smoothly and without interruption in machining the contour dictated by the input data.

INTERPOLATOR

Figure 2A:
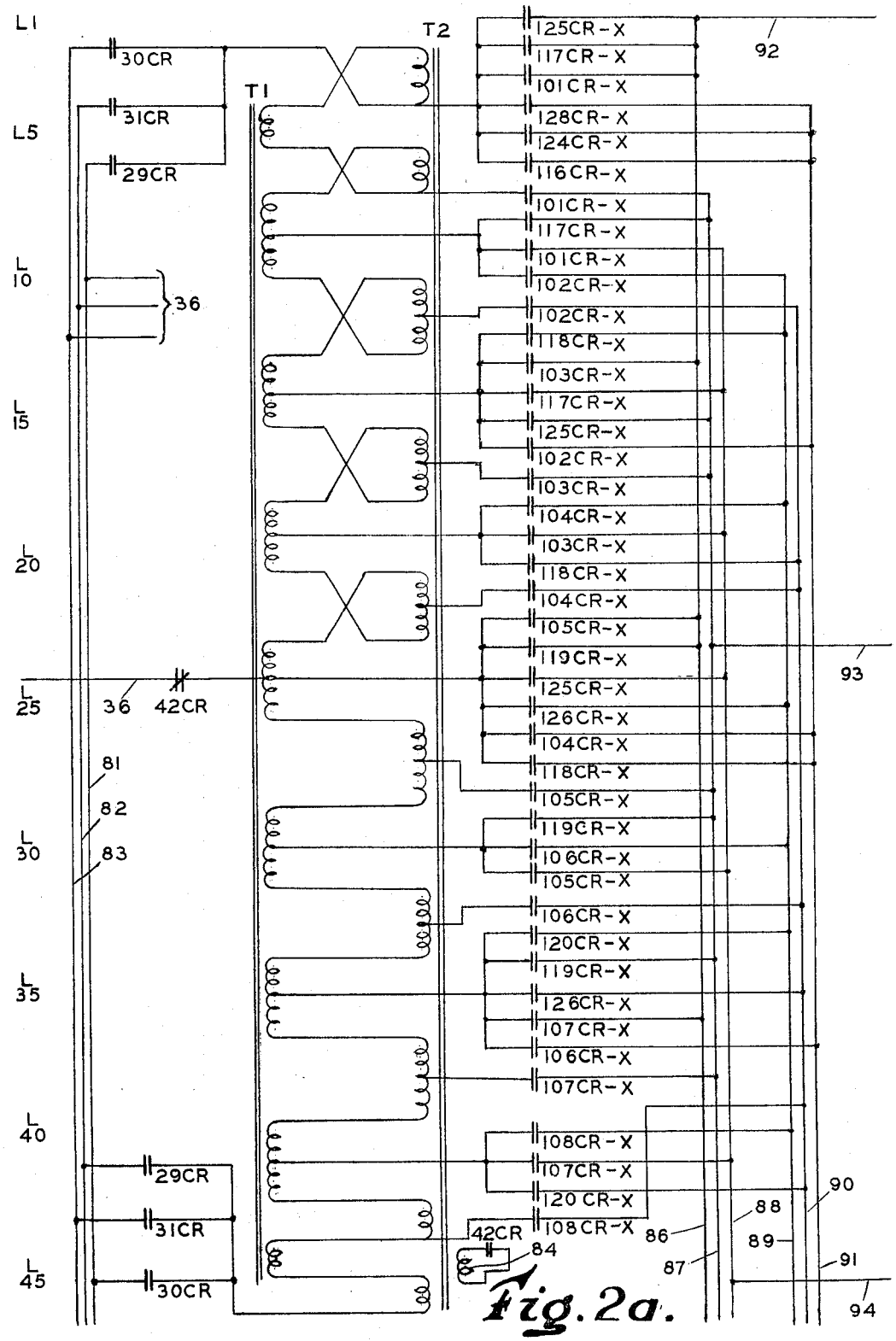
Figure 2B:
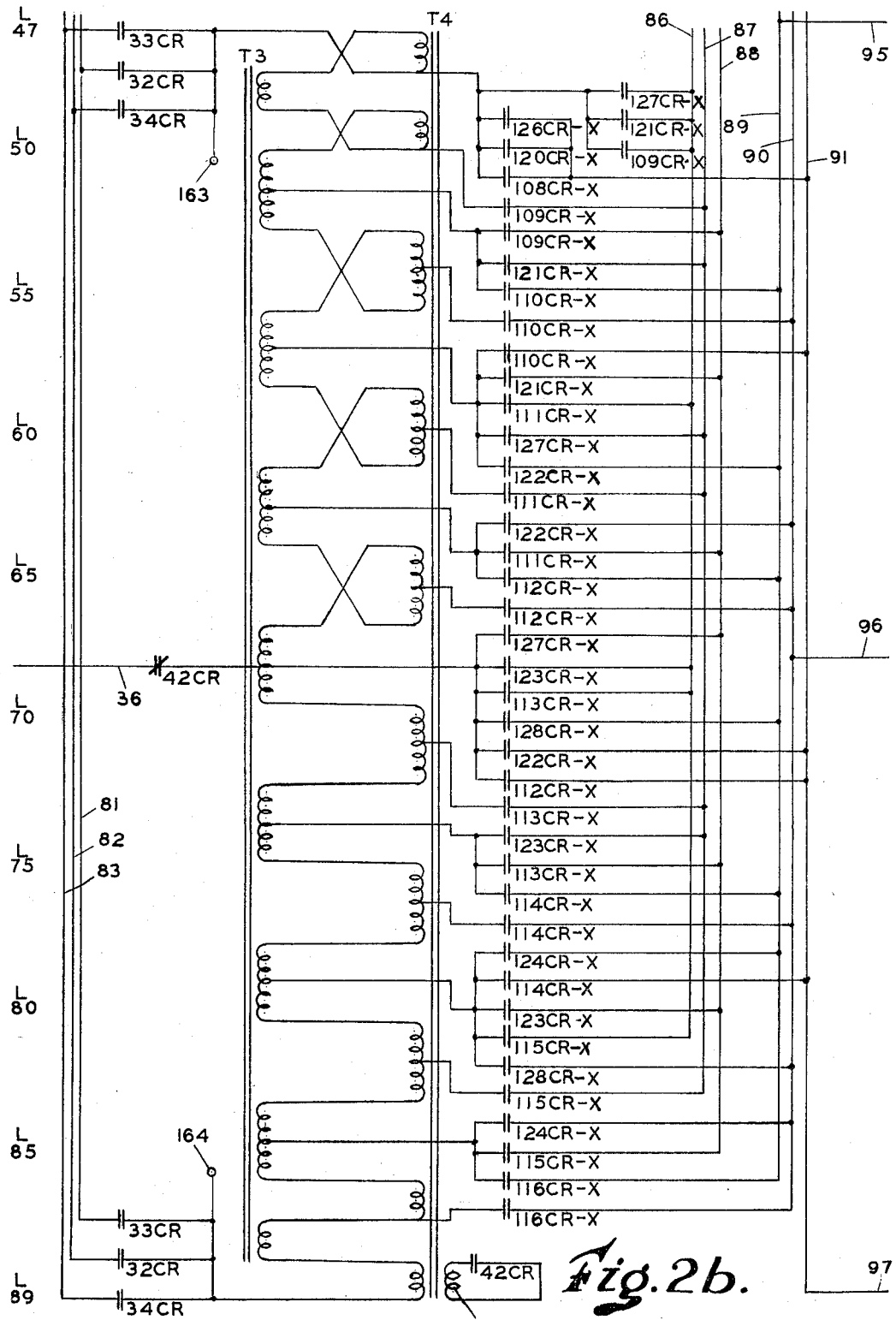

In FIGS. 2a, 2b, 2c and 2d is shown a preferred form of the X-axis interpolator 38 which is made up of three stages, the first two of which are parabolic and the last of which is linear. It will be understood that the Y-axis interpolator is identical to the one shown herein and identified with the X-axis. Each interpolator stage has two identical bridges. The first stage, which is shown in FIGS. 2a and 2b, includes the autotransformers T1 and T2 which comprise the first stage A-bridge. The transformers T3 and T4 comprise the first stage B-bridge. Looking first at the A-bridge, the transformers T1 and T2 are toroidally wound on separate cores but are wound with a common conductor. The tapoff points or output terminals on the transformer T1 are linearly spaced along its winding and the transformer can be described as being linear. The transformer T2 has its taps spaced in a quadratic relationship and, in the preferred form, they are spaced in a symmetrical parabolic relationship. The transformer T2 can therefore be described as being parabolic.

When a non-linear exciting input is applied to the transformers T1 and T2, a parabolic analog output will be available along the taps of the transformers. An input exciting voltage is applied to the ends of the transformers T1 and T2 through the leads 81, 82, 83 and the conductors 36 (L10, L11, L12) from the stores. The input consists of three analog voltages representing the two end points and the midpoint of a portion or span of a particular parabolic curve. The transformer T1 will produce a linearly progressing component of voltage to which is added a symmetrical parabolic component from the transformer T2. The sum is an asymmetrical parabolic analog voltage appearing on the taps of the transformers.

The A-bridge transformers may be utilized to provide a purely linear output analog as well. For this, only the two end point exciting voltages are applied to the bridge. The parabolic windings of transformer T2 are symmetrical and the windings on one half are wound opposite to those on the other half. With no midpoint input voltage applied to the transformer, the current flow in the two halves of the parabolic winding will be equal and the net flux resulting in the transformer T2 will be zero. Therefore, the transformer T2 will not contribute to the total output and the analog voltage at the output taps will progress in a linear manner and will represent a straight line between the end points represented by the exciting voltages. In the event that the windings of the transformer T2 are not perfectly symmetrical, a slight amount of net flux will result. Therefore, a shorting winding 84 is wound on the same core with transformer T2 and that winding is shorted by closing the contacts of a relay 42CR during linear interpolation. The shorting of the winding 84 reduces the net flux in the core of transformer T2 to zero.

The B-bridge of the first stage is identical to the first stage A-bridge. The B-bridge is comprised of the linear transformer T3 and the parabolic transformer T4. A shorting winding 85 is also wound on the core of the transformer T4 to insure that the net flux in that core is zero when parabolic interpolation is desired. Contacts of relay 42CR are used here also to short the winding during linear interpolation.

The bridges of the first stage are operated in a hand-over-hand manner. The input to the lower end of the A-bridge is the input to the top end of the B-bridge when the shift is made from the A-bridge to the B-bridge. The input to the lower end of the B-bridge is the input to the top end of the A-bridge when the shift is made from the B-bridge back to the A-bridge. Thus it can be seen that only three end point store inputs on the conductors 36 (L10, L11, L12) need to be furnished to the interpolator since at the time of change from one bridge to the other, one input is common to both bridges. Inputs are also required on each of the conductors 36 (L24, L68) at the midpoints of the bridges during parabolic interpolation, i.e., one midpoint input for each bridge. The first stage of the interpolator is connected to the end point store leads 36 (L10, L11, L12) through conductors 81, 82, 83 in which contacts of relays 29CR through 34CR (L2–L6, L41–L49, L87–L89) are included to control the connections to the stores in the proper sequence. The midpoint stores are connected to the respective bridges through conductors 36 (L24, L68) in which normally closed contacts of the relay 42CR are included. During linear interpolation, relay 42CR is energized and these contacts are opened to disconnect the midpoints from the stores.

Figure 2C:
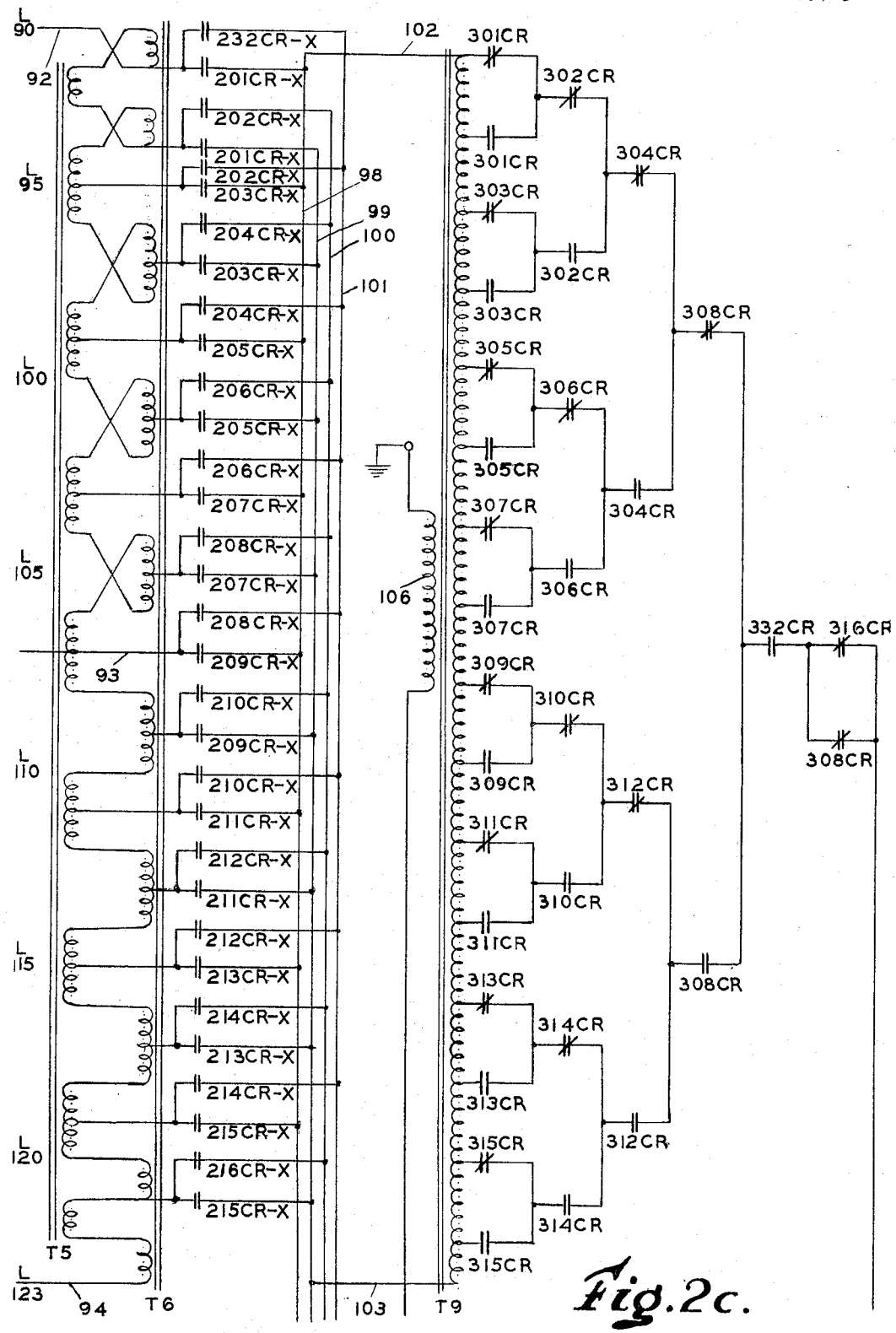

The second stage of an interpolator is also comprised of two identical bridges, each of which has two autotransformers. The second stage A-bridge, FIG. 2c, is comprised of the linear transformer T5 and the symmetrical parabolic transformer T6. These transformers are wound and function in the same manner as described for the first stage bridges. During interpolation, three output signals at a time are taken from the first stage and applied through conductors 86–91 (FIGS. 2a, 2b) and input leads 92–97 as inputs to the second stage bridges. These inputs are analogs representing the end points and the midpoint of a part or sub-span of the entire span across the first stage bridge from which they are taken. In parabolic interpolation these sub-spans will be asymmetrical parabolic curves and the transformer T6 will contribute to the voltage appearing at the output taps of the second stage A-bridge. During linear interpolation, the three input points to the second stage will have a straight line relationship and the net flux resulting in the symmetrical windings of transformer T6 will be zero and the transformer T6 will not contribute to the output analog. Therefore the analog appearing at the output taps of the second stage will progress linearly along the bridge for linear interpolation.

Figure 2D:
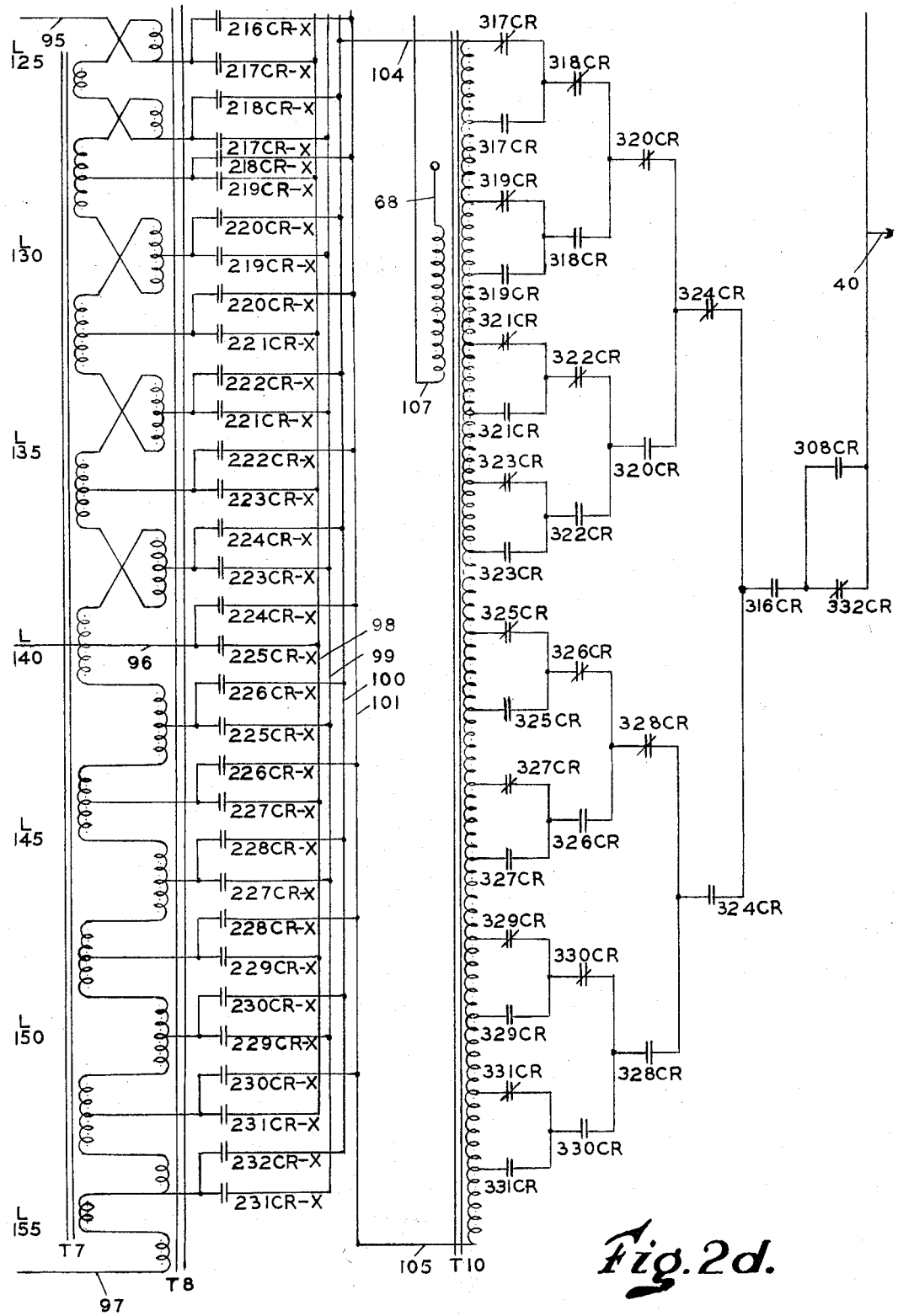

The transformers T7 and T8, FIG. 2d, comprise the B-bridge of the second stage. These transformers are identical to the transformers T5 and T6 both in construction and operation. The A and B bridges of the second stage are also operated in a hand-over-hand cyclic order. The second stage will make a plurality of cycles for each cycle of the first stage since each cycle through one of the bridges of the second stage represents only a sub-span of the first stage.

The third stage of the interpolator is made up of two bridges. Each of the third stage bridges is a single, linearly tapped toroidal autotransformer. The transformer T9, FIG. 2c comprises the third stage A-bridge and the transformer T10, FIG. 2d, comprises the third stage B-bridge. Both of these transformers are identical and both operate in a hand-over-hand cyclic order. The third stage makes a plurality of complete cycles for each complete cycle of the second stage. The input to the third stage is derived from the output taps of the second stage and applied through the conductors 98–101 and input leads 102–105 as end point voltages to the transformers T9 and T10. These end point voltages are analogs of the end points of a sub-span of the span represented by the voltages applied as inputs to the second stage bridges. The third stage of the interpolator also contains a pick-off winding 106, 107 on each of the transformers T9 and T10. The pick-off windings are serially connected together to provide an output signal representing the third stage interpolator span length which may be used as a signal proportional to the rate of change of movement along one of the axes of control. The signal from the X-axis interpolator can be termed delta X and the signal from the Y-axis interpolator, delta Y.

THIRD STAGE SWITCHING

The third, second, and first stages of each of the interpolators can be considered in terms of cycle speed as high, medium, and slow speed stages, respectively. Referring to FIGS. 2c and 2d, an output is taken from the third stage of the X-axis interpolator by means of a series of taps along transformers T9 and T10. The output is obtained by the repeated cyclic energization of a ring of relays 301CR through 332CR, controlling switch contacts in a tree circuit between the third stage bridges and the output lead 40. The output lead 40 will be connected successively to each of the taps as the contacts of the relays 301CR through 332CR are cycled through their energized-deenergized states. In operation, the tap from which the third stage output is taken is advanced or propagated one tap at a time.

The relays whose contacts are shown in the relay tree between the output lead 40 and the third stage bridges are, in the preferred form of the invention, reed relays having mercury wet contacts. A relay of this type is shown in U.S. Patent 2,914,634 granted November 24, 1959, to C. P. Clare and Company on application filed by Arthur J. Koda. The pairs of contacts of the relays 301CR through 332CR in the output tree are make-before-break contacts. The relays are so controlled that there are always sixteen in succession energized and sixteen in succession deenergized. Assume that relays 318CR through 332CR and 301CR are energized. Their controlled contacts in FIGS. 2c and 2d will then be reversed from the condition shown. A circuit will be completed to the output lead 40 through the normally open contacts of relay 301CR (L127), now closed, to a tap on the transformer T9. Since the contacts of relay 316CR (L139) are as shown, no circuit is completed from the transformer T10 to the output lead. Also, due to the state of the contacts of relays 302CR (L97), 304CR (L112), and 308CR (L115), no other circuit is completed from the transformer T9 to the output lead 40.

By energizing the relay 302CR and deenergizing the relay 318CR, the block of energized relays is advanced one step. A circuit is then completed to the output lead only through the normally open contacts of relay 302CR (L97), now closed, from the next tap down on the transformer T9. It can be seen that as the next relay is energized and as the trailing relay of the energized relays is dropped, the output lead is connected successively to each of the taps along the transformer T9. When the cycle has progressed to the time at which relay 316CR is energized, the step is made from the last tap of the transformer T9 to the first tap of the transformer T10. At the same time that the contacts of relay 316CR (L107, L139) are placed in an energized condition, the relay 332CR is deenergized to condition its contacts as shown (L107, L139). Contacts of the relay 308CR (L109, L135) are in parallel with the normally closed contacts of relays 316CR (L107) and 332CR (L139) and change to the energized condition about a quarter of a cycle before relay 316CR is energized. With the arrangement of contacts as described, the transfer from transformer T9 to transformer T10 can only be made when relay 316CR is energized. In normal operation the relays described will energize faster than they will deenergize. Consequently relay 316CR is energized slightly before relay 332CR is deenergized and the transfer will be made immediately since the normally open contacts of relay 308CR (L135) are already closed.

The relays 317CR through 331CR are next energized in succession to connect each of the output taps of transformer T10 to the output lead. Then relay 332CR is energized to connect the output lead 40 back to the transformer T9. The relay 332CR must be energized before the transfer is made. The contacts of relay 308CR (L109) are put in the deenergized condition shown about a quarter of a cycle before the relay 332CR is energized. Therefore, the transfer will be made when relay 332CR energizes which occurs a slight instant before relay 316CR is deenergized.

It has been noted that the contacts of relays 301CR through 332CR are make-before-break contacts. The load current through the output lead is very small. Desirably there may be a small resistance (not shown) provided at each of the taps of the transformers T9 and T10. This small resistance will prevent a direct short between adjacent taps at the brief instant of make-before-break in relay contacts. In addition the resistance at the taps has the effect of causing the output potential to appear as if there were another tap between each of the actual taps. This is so since at the instant of make-before-break, the small resistances at the adjacent taps will provide a voltage divider which will apply only half of the potential difference between the taps to the output lead 40. Since the output current is very small, the resistances have no appreciable effect on the output potential. Also, the relative lead and lag in the operation of the relays 316CR and 332CR will not be greater than the make-before-break period and the output will not be disconnected from both of the third stage bridges at any time.

SHIFT REGISTER

The propagation of the switching in the relay tree on the output side of the third stage of the interpolator is controlled by a ring circuit which includes thirty-two shift register stages SR1 through SR32, FIG. 3. Each stage of the shift register controls the operation of a solenoid driver, SD1 through SD32, connected to an output lead 108 from each of the shift register stages. Each of the shift register stages may be placed in a set or reset condition. With the shift register stages in the set condition the solenoid drivers will be turned on, and with the shift register stages in the reset condition the solenoid drivers will be turned off. The solenoid drivers SD1 through SD32 are all identical direct-current amplifiers of a kind well known in the electrical control art. Each will produce current enough to operate several reed relays when turned on. Each of the solenoid drivers has a set of parallel reed relay energizing coils, 301CR–332CR, 301CR'–332CR', connected in its output. There is a reed relay coil connected to each solenoid driver for each interpolator in the complete control mechanism and these are the energizing coils for third stage switching in the interpolators. Thus, the coils of the reed relays 301CR through 332CR for the X-axis interpolator are connected to the solenoid drivers SD1 through SD32, respectively. The coils of the reed relays 301CR' through 332CR' for the Y-axis interpolator are connected in parallel with those of relays 301CR through 332CR. In the event that additional third stage switching relays are needed, the coils for these relays may be connected to the appropriate solenoid driver in parallel with the other relay coils. Such additional relays might be required for a machine having more than the two interpolators shown herein.

The shift register stages SR1 through SR32 are connected in a ring and are initially set to place a block of sixteen stages in succession in a set condition, and the remaining block of sixteen stages in a reset condition. The blocks of sixteen stages are then caused to step around the ring to effect the described sequential energization of the reed relays 301CR through 332CR which have their contacts connected with the output taps of the third stage of the interpolator. The use of the mercury wet reed relays permits a very short cycle time since the relays may be operated at an extremely fast rate. In fact, in the present embodiment of the invention, the relaying of the third stage has been operated by pulses having a frequency range of from 20 to 4096 pulses per second.

The shift register stages SR1 through SR32 are identical and are connected in a continuous ring as indicated. Each of the shift register stages is comprised of a flip-flop circuit, as shown in FIG. 4, having two transistors 109, 110 so connected that when one is conducting the other is biased to cut-off. The solenoid driver associated with the stage shown in FIG. 4 is connected to the output lead 62'. When the output lead 62' is at ground potential, the flip-flop is in its set condition and the solenoid driver is turned on. The output lead 62' is held at ground potential when the transistor 110 is conducting. This is because its emitter is connected to ground and when saturation current flows through the transistor, there is no potential difference between the emitter and the collector.

When the interpolator is initially set at the beginning of an operation, a relay 68CR is energized so as to close its contacts in the shift register set line 111 (FIG. 3) and connect the set line 111 to ground potential. The set line is connected to a set terminal 112 of the shift register stages SR18 through SR32 and SR1. Thus, in these stages, the base of the transistor 109 is held at a positive value somewhere between the +12 volt supply terminal and ground due to the divider action of the resistances R10, R11, R12 connected in series between the +12 volt supply source and the −18 volt supply source. With the base of the transistor 109 in this condition, it is biased to cut off and no current flows from emitter to collector. Therefore, the collector is at a −6 volts, the same as the −6 volt supply line. Due to the divider action of the resistances R13, R14, R15 between the +12 volt supply line and the −18 volt supply line, the base of the transistor 110 is at a more negative value than the base of the transistor 109. Therefore, the transistor 110 is turned on and conducting. Its collector is then at ground potential. The solenoid drivers connected to shift register stages SR18 through SR32 and SR1 are all turned on when the interpolator is initially set.

In the other sixteen shift register stages, SR2 through SR17, the set line 111 is connected to the reset terminal 113. The transistor 110 is biased off in the same manner that the transistor 109 was biased off with ground on the set terminal 112. The base of the transistor 110 is held at a positive bias level due to the ground on terminal 113 and the divider network resistances R13 and R14, between the +12 volt supply and the reset terminal 113, and therefore, is biased off. Its collector is then at the same potential as the −6 volts supply line.

The transistor 109 is turned on in the shift register stages, SR2 through SR17, since its base is biased negative with respect to ground, the bias thereon being controlled by the divider including resistances R10, R11, R12 between the +12 volt supply and the −18 volt supply. In the shift register stages SR2 through SR17, the output lines 62′ and 108 are at −6 volts while the other output line 114 is at ground potential. The relays 302CR through 317CR are deenergized when the interpolator is set.

During operation of the interpolator, negative pulses from the pulse generator 58 are coupled from the shift line 115 to the terminal 116 of each of the shift register stages (FIG. 3). The output line 108 of the preceding shift register stage in the ring is connected to the input line 118 and the other output line 114 of the preceding stage is connected to the other input line 117.

Assume that the circuit shown in FIG. 4 is that of the shift register stage SR2. Therefore, immediately after the interpolator is initially set with stages SR18–SR32 and SR1 set and stages SR2–SR17 reset, the input line 117 which is connected to the output line 108 of the shift register stage SR1 is at ground while the other input line 118, connected to the output line 114 of shift register stage SR1, is at −6 volts. At the first negative pulse supplied to terminal 116 from the shift line 115, the capacitor C10 is charged, and when the shift line returns to ground potential after the pulse has passed, the capacitor discharges and momentarily biases the base of the transistor 109 to ground potential. The ground bias on the base is sufficient to shut off transistor 109 which in turn drives the base of transistor 110 negative to turn it on. Consequently, the reset condition of the shift register stage SR2 is changed to a set condition after the pulse.

To complete the shift of the block of sixteen stages, it is necessary that the relative condition between the shift register stages SR17 and SR18 be reversed from that described above for the shift register stages SR1 and SR2 prior to the first pulse after the interpolator is initially set. The stage SR17 being reset, input line 118 of stage SR18 is at ground potential while the other input line 117 is at −6 volts. The stage SR18 being set, its transistor 110 is conducting and its transistor 109 is at cutoff. The shift register stage SR18 remains in this condition until the first shift pulse. The base of the transistor 110 is biased by the action of the divider network including the resistances R13, R14, R15 between the +12 volt supply and the −18 volt supply. When the first negative pulse is coupled to the capacitor C11 from terminal 116, the base of the transistor 110 is driven positive after the pulse has passed and is turned off while the transistor 109 is turned on. Therefore, the condition of the shift register stage SR18 is changed from set to reset and its solenoid driver is turned off.

The other shift register stages, SR3 through SR17 and SR19 through SR32 and SR1 remain unchanged by the first pulse on the shift line. The input lines 117, 118 of the shift register stages SR3 through SR17 are at −6 volts, and ground, respectively, and the transistor 110 of each stage is turned off. The positive pulse from the capacitor C11 to the base of the transistor 110 tends to drive that transistor 110 farther in the cut-off direction. In the circuit of the other transistor 109, the −6 volts on the input line 117 prevents the pulse through capacitor C10 from raising the base of the transistor 109 to the cut-off level. Therefore, the shift register stages SR3 through SR17 do not change condition.

The shift register stages SR19 through SR32 and SR1 also remain unchanged at the first pulse. The input lines 118, 117 are connected to the output lines 114, 108 of preceding stages which are at −6 volts and, ground, respectively. The transistors 110 of these shift register stages are turned on and the transistors 109 are turned off. The first shift pulse will tend to drive the transistors 109 farther into the cut-off region while a positive pulse is prevented from reaching the base of the transistor 110 by the −6 volts on the input line 118.

It thus can be seen that the first pulse from the pulse generator 58 advances the block of sixteen shift register stages in a set condition by one step. The only change occurs in those stages where the condition of the flip-flop is the opposite of that in the next preceding stage before the pulse occurs. Since the flip-flops do not change condition until after the pulse has passed, there can be no change-on-a-change during a single pulse. In this manner, a series of negative pulses on the shift line 115 is utilized to propagate the energization of the block of sixteen solenoid drivers which, in turn, energize their respective third stage relays around the ring circuit in cyclic fashion.

The speed of the cycle of relay operation in the third stage is dependent upon the frequency of negative pulses furnished to the shift line 115 from the pulse generator 58. The negative pulses are developed in the pulse generator 58 and connected through the conductor 59 to a cycle start switch SW1. When the switch is in the "Off" position shown in FIG. 3, the conductor 59 is disconnected from the shift line 115 which is grounded through the switch. After the interpolator is initially set and the interpolator operation is to be started, the switch SW1 is turned to the "On" position which connects the conductor 59 to the shift line 115. This allows the series of pulses from the pulse generator 58 to pass through to the shift register ring.

PULSE GENERATOR

Figure 5:
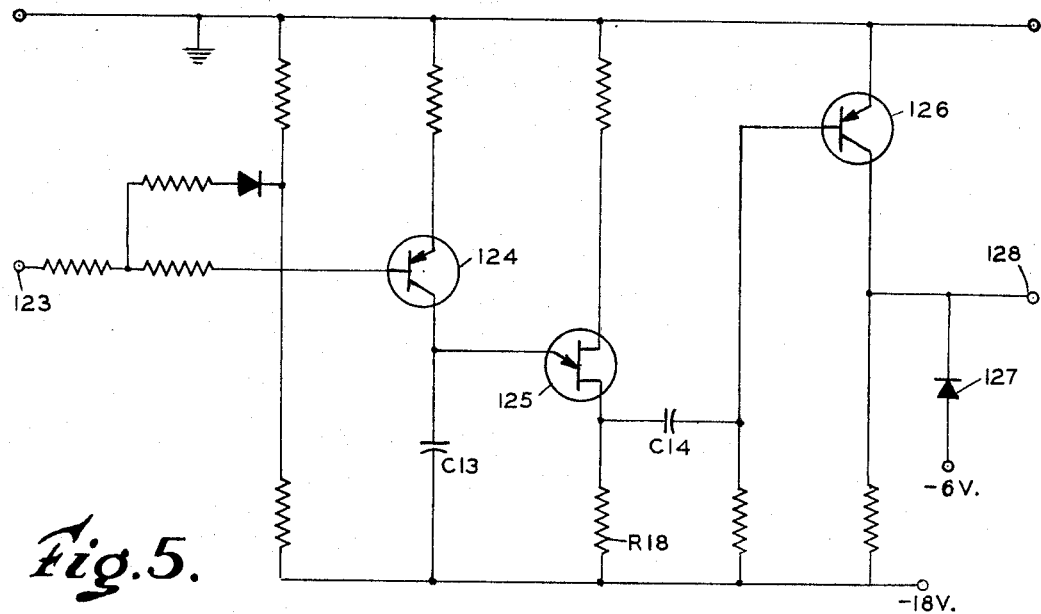
FIG. 5 is a wiring diagram of a pulse generator.

The pulse generator circuit is shown in FIG. 5. A rectified and amplified signal from the divider circuit 67 (FIG. 1) representing the quotient of the feed rate analog, obtained from the feed rate stores 34, divided by the instantaneous span length analog SL is applied from the input line 73 to terminal 123 to develop a bias potential on the base of a transistor 124. The transistor 124 is a current source for charging a capacitor C13 which is connected in series with the transistor across the ground and −18 volt supply lines. The level of conduction of the transistor 124 is determined by the bias resulting from the quotient signal, and the level determines the charging time for the capacitor C13.

One side of the capacitor C13 is connected to the emitter of an unijunction transistor 125 which serves as a relaxation oscillator in the circuit. The characteristic of the transistor 125 is such that there is a high resistance to a current from the emitter to the base (biased at a negative value) until the voltage at the emitter reaches a critical potential. At that time, the transistor 125 has a negative resistance characteristic and the current from emitter to base rises rapidly to a high level. When the voltage on the emitter falls to a predetermined level, the transistor 125 again presents a high resistance and current flow through the collector is virtually stopped until the voltage on the emitter again rises to the critical potential at which time a saturation current again will flow through the transistor.

It can be seen from the circuit that the emitter of the transistor 125 is connected to the positive side of the capacitor C13 and, as that capacitor charges, the voltage on the emitter will rise. When the voltage reaches the critical potential, the transistor 125 acts as a short circuit to quickly discharge the capacitor C13 through the resistance R18. When voltage on the capacitor C13 falls to the point at which the transistor 125 ceases to conduct, the capacitor C13 will begin to charge again at a linear rate determined by the conduction level of the current source transistor 124.

The signal shape at the capacitor C13 can be described as a saw tooth. At the base of the unijunction transistor 125, the signal has the form of a relatively high positive peak or pulse of short duration. The positive pulse is coupled through a capacitor C14 to the base of a transistor 126. The transistor 126 is normally biased to saturation so that there is then no potential drop across it. When the positive pulse is coupled to the base of the transistor 126, it is driven sharply to cut-off. A diode 127 is connected to a −6 volt supply and serves to clamp the collector of the transistor at a −6 volt level. Therefore, during the short time that the transistor 126 is at cut-off, the potential at the pulse generator output terminal 128 is −6 volts. The result is a squared off negative pulse of short duration at the output, the amplitude of the pulse being −6 volts. The frequency of these pulses, which determines the cycle time in the third stage of the interpolator, is determined by the quotient input of programmed feed rate FR divided by the instantaneous span length SL.

The feed rate analog FR is determined from the coded tape input which sets up the feed rate stores 34. There are two separate units 34A, 34B (FIG. 6) included in the feed rate stores 34. One of these stores can be set while the other is in use in order that a change from one feed rate to another can be made when such a change is required. The alternating current reference voltage is applied to the feed rate stores 34A, 34B through a feed rate override control which comprises a manually set variable potentiometer 129. The feed rate override is normally set to apply full reference voltage to the stores 34A, 34B. In the event that it is desired to reduce the feed rate of the machine, the override potentiometer 129 may be manually set to reduce the reference input voltage to the feed rate stores 34A, 34B. The output analog from the feed rate stores 34A, 34B thereby will be proportionally reduced.

ACCELERATION–DECELERATION UNIT

An acceleration and deceleration unit 65 is connected between the output of the feed rate stores and the input of the divider circuit. The unit includes a potentiometer 130 having a wiper 131 driven by a reversible two phase motor 132. Each time a span change is effected in the interpolator, the motor 132 moves the wiper from one end of the resistance element 130 to the other. When the wiper 131 reaches the end of the potentiometer, it engages one of a pair positive stops 133, 134 and the motor 132 is stalled. The motor remains stalled until reversed. It is then run in the opposite direction until the wiper engages the other stop whereupon it is stalled again. The motor reversal occurs at each change of span and a fixed amount of time is required to move the contact 131 from one of the stops 133, 134 to the other, this time being less than that required for the machine to traverse the shortest span length which can be programmed. The acceleration and deceleration unit 65 gradually changes the analog output from the feed rate stores 34 from one value to another in the event that different feed rate analogs are set up in the stores 34A, 34B. This will gradually change the feed rate analog when a feed rate alteration is required. A sudden change in feed rate signal, as would be effected by relay contacts is unsatisfactory since it demands infinite acceleration or deceleration at a span change. When the wiper is against one of the stops 133, 134, it is on the output terminal of one of the stores. Thus, after the wiper is moved, the other store output may be changed in preparation for the next span without affecting the feed rate analog in use.

The contacts of relays 76CR and 77CR control the reversal of the motor 132 at each change of span. The relay 76CR is the first stage A-bridge signal relay and the relay 77CR is the first stage B-bridge signal relay. Each of these is energized and latched when the interpolators are operating on the respective bridges. By connecting the contacts of these relays in circuit with one of the motor windings 135, as shown, the reversal of the motor 132 is accomplished at each change of span.

The instantaneous span length signal SL is obtained by vectorially summing the lengths of the third interpolator stage span lengths, delta X and delta Y. Voltages representative of the span lengths, delta X and delta Y, are obtained from the secondary winding in each of the third interpolator stages. The windings on the X-axis interpolator from which the voltage delta X is derived are shown in FIGS. 2c and 2d where they are numbered 106 and 107. Corresponding windings are provided on the Y-axis interpolator for producing the voltage delta Y. As indicated in the block diagram, FIG. 1, these two voltages are vectorially added in the summing circuit 70 after one of them is phase shifted 90 degrees. The output of this circuit is the instantaneous span length signal SL which is amplified, rectified, and applied as a direct current input to the dividing circuit 67.

It is pointed out that the instantaneous span length signal SL provides the control system with a look ahead to see what is coming as well as what is happening instantaneously since the windings 106, 107 are serially connected. Both of the third stage bridges provide a portion of the signal SL but only one is connected to the output lead 40 at a time (except at the make-before-break crossover from one to the other). Due to the hand-over-hand operation, the next third stage bridge to be used will be connected to the second stage outputs prior to its connection to the output lead 40 by the third stage switching. Thus the span length signal SL is looking both at the instantaneous third stage span length and the next third stage span length to be used. The quotient of the feed rate analog FR divided by the instantaneous span length analog SL is obtained from the dividing circuit 67.

THE DIVIDING CIRCUIT

The amplification of the span length signal SL is performed in a conventional alternating current amplifier 190, FIG. 7b, to which the conductor 72 from the summing circuit 70 is connected. The amplified span length signal SL is then applied to the primary winding of a transformer 191. The secondary winding of the transformer is part of a full wave rectifying circuit including the diodes 192 and 193. The rectifying circuit is referenced with respect to the −18 volt supply to which the center of the secondary winding is connected. The output from the rectifying circuit is a direct current signal rising from the −18 volt level to a less negative level as the A.C. span length signal input from the conductor 72 to the amplifier 190 increases. The rectified span length signal is coupled through the lead 136 into a direct current amplifier portion of the divider circuit 67 which is shown in detail in FIG. 7a.

The lead 136 connects with the emitter of a transistor 141 which has its collector connected to ground through a load resistor R21. The junction between the collector of the transistor 141 and the resistor R21 is connected through a Zener diode 142 to the base of a transistor 140.

The transistor 140 is connected with a second transistor 139 to form a high current gain, or super alpha, circuit of the type commonly referred to as a Darlington circuit. The transistors 139, 140 can be considered as a single transistor having a base connected to the Zener diode 142, an emitter connected to a resistor R20, and a collector connected to a resistor R19. The resistor R19 is connected to ground potential at its end opposite the transistors 139, 140. The resistor R20 is connected to a diode 143 which, in turn, is connected to the −18 volt supply.

A bleed circuit through the diode 143 is provided by a resistor 144 connected between ground and the anode of the diode. Accordingly, a small current will flow at all times through the diode. The diode is so chosen that its anode to cathode resistance in the forward direction is equal to the base-to-emitter resistance of the transistor 141. The voltage drop across the diode references the feed-back bias on the base of transistor 141 to a level which just compensates for the internal resistance of the transistor when it conducts.

With no current flow through the transistors 139 and 140 and with a zero span length input signal on lead 136, i.e., a −18 volts potential on the emitter of transistor 141, the bias produced on the base of the transistor by the voltage drop across diode 143, is such as to cause sufficient current to flow through the transistor, and resistor R21, to just bias the base of transistor 140 to the point of incipient conduction through the Darlington circuit. In other words, the voltage drop produced across resistor R21 by the current flow through transistor 141, plus the voltage drop across the Zener diode at the point of breakdown, is equal to approximately 18 volts. With zero current flow through the Darlington circuit and through the resistor R19, the conductor 148 will be at D.C. ground.

When a span length voltage is applied to lead 136, the emitter of transistor 141 will become less negative, thereby reducing the current flow through resistor R21. Hence, the cathode of Zener diode 142 will become less negative as will also the base electrodes of transistors 140 and 139, and current now will flow through resistor R19 and the Darlington circuit to the −18 volt terminal.

The small resistor R20 in serial connection between the Darlington circuit and the −18 volt supply will have a potential thereacross proportional to the current flow through the Darlington circuit and this potential produces a negative feed-back bias on the base of the transistor 141. As that current increases, the potential on the base of the transistor 141 will be raised to a slightly less negative value and the current flowing through the transistor and resistor R21 will increase. The effect of the feed-back bias is to maintain the current flow through the transistor 141 at a proper level to produce a bias on the Darlington circuit such that the current flow therethrough is directly proportional to the span length signal SL. In other words, the base of transistor 141 will follow the emitter voltage, i.e., the span length signal, as will also the conductor 148. The conductor 148, however, will become more negative as the span length signal becomes more positive and, since resistor R19 has a much larger resistance than resistor R20, the negative voltage produced on conductor 148 by the span length signal will be in proportion to the span length signal but will be considerably amplified.

The properties of the Darlington circuit are such that it presents a high impedance to the alternating current signal at the input terminal 137. Thus, the input signal will tend to be developed across the bias resistance R19 and a series resistance R22 which are the series load resistances for the alternating current input at the terminal 137. The parallel resistor-diode circuits 145 form a variable attenuation circuit in parallel with the bias resistance R19. This chain of parallel circuits will attenuate part of the input signal on the terminals. The amount of attenuation is directly proportional to the direct current component through the bias resistance R19. The direct current through the resistance R19 is directly proportional to the instantaneous span length signal SL as described.

The parallel resistance-diode attenuators 145 are normally biased to cut-off by a potential developed through a voltage divider comprised of the resistances R23, R24 in series between ground and the supply terminal 147 which is maintained at a fixed negative potential by an external supply. It can be seen that the bias impressed on the anodes of the attenuator diodes by this divider progresses from a more negative to less negative value in the direction from right to left in FIG. 7a. With no direct current through the bias resistance R19, all of the attenuators 145 are blocked in effect and are open circuits. The entire feed rate signal then will be developed across the bias resistance R19 and the series resistance R22. If the ratio of the series resistance R22 to the bias resistance R19 is 1 to 2 for example, the output at the terminal 146 will be approximately .67 times the feed rate analog with no instantaneous span length signal SL. As the direct current through the bias resistor R19 increases due to an increased instantaneous span length analog, the bias on the conductor 148 goes more negative. When it reaches a level equal to or greater than the negative bias on the anode of the diode in the first attenuator 145, the first attenuator diode is unblocked and the amount of resistance in series with the resistance R22 is decreased to something less than twice the value of the resistance R22. The output alternating current potential on the terminal 146 is decreased then since a higher proportion of the feed rate signal is developed across the series resistance R22. With a continued increase of direct current through the bias resistance R19, more of the attenuators 145 will be placed in the circuit in parallel with the bias resistance R19 and more of the input feed rate signal will be dropped across the series resistance R22. Consequently the output signal will be reduced in amplitude.

From the foregoing, it is apparent that the attenuation of the feed rate analog is greater as the direct current through the bias resistance R19 is increased. The direct current through the resistance R19 is directly proportional to the span length analog signal. Therefor, by proper circuit component selection, the alternating current output is proportional to the quotient of the feed rate divided by the instantaneous span length. Since the attenuation of the feed rate signal tends to occur in steps, one step for each of the parallel attenuators, the output will tend to vary by steps from one level to another. However, the corners of the steps tend to round off in the output due to the characteristics of the diodes in the attenuators 145. Therefore the output level will not change abruptly but have a tendency to change somewhat gradually. The output quotient analog, for a given feed rate, when plotted against the instantaneous span length will more nearly approximate a smooth curve due to the rounding off of the steps from level to level. The curve approximated by the plot of output against instantaneous span length is determined by the design selection of resistances R23 and the resistances in the parallel attenuators 145.

The output from the divider is in the form of an alternating current. This is rectified and amplified in a conventional rectifying and amplifying circuit 149 (FIG. 3) prior to its application to the pulse generator which has been described.

SECOND STAGE SWITCHING

The cyclic switching in the third stage of the interpolators is determined by the cyclic operation of the ring-type shift register. The cycle time of the register is determined by the frequency of the pulses connected thereto from the pulse generator. The pulse frequency depends upon the quotient of the programmed feed rate divided by the instantaneous span length. The second stage of each interpolator is selectively connected to the third stage thereof such that successive sub-spans of the second stage are applied to the ends of the third stage A- and B-bridges alternately. Thus, each sub-span of a second stage bridge becomes an entire third stage span. The second stages are connected to the third stages under the control of a relay ring circuit. The energization of the relay ring circuit on each half cycle of operation of the shift register, causes the relay ring to step from one relay to the next. This propagation of relay energization of the second stage relay ring circuit is accomplished by pulses received from the shift register.

Figure 11:
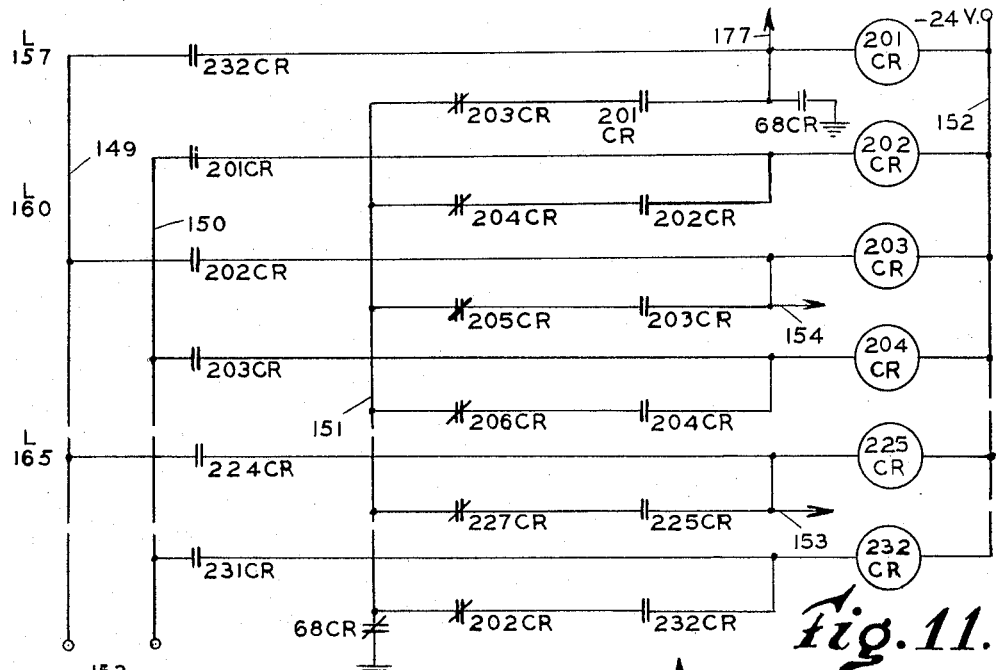
FIG. 11 is a wiring diagram of a relay ring to control the second stages of the interpolators.

The relay ring circuit controlling the second stage switching is shown in FIG. 11. Included in the circuit are reed relays 201CR through 232CR, inclusive, although in FIG. 11 only the relays 201CR through 204CR, 225CR, and 232CR have been shown for the sake of brevity. The omission of relays is indicated by the breaks in lines 149, 150, 151, 152. The omitted relays are connected in numerical order and operate in the same manner as the relays shown. The vertical conductor 152 at the right side of the drawing is connected to a −24 volt direct current supply. The vertical conductor 149 at the left side of the drawing is connected to the output from the solenoid driver SD17 (FIG. 3) and is at ground potential only when that output is at ground. This occurs for the sixteen counts of the third stage cycle during which the solenoid driver SD17 is energized. This is the time during which the output of the interpolators is taken from the third stage B-bridges. The conductor 150 immediately to the right of the conductor 149 is connected to the output of the solenoid driver SD1 (FIG. 3) and is grounded for the sixteen counts of the third stage cycle when the output is taken from the A-bridges. The remaining vertical conductor 151 is connected to ground potential through normally closed contacts 68CR (L169) of the interpolator set relay 68CR (L291).

It can be seen that the odd numbered relays in the ring are arranged to be energized from the conductor 149 which is connected to ground while the output of the interpolators is taken from the third stage B-bridges. The even numbered relays of the ring are arranged to be energized from the conductor 150 which is connected to ground when the output is taken from the A-bridges. Both the odd and even numbered relays in the ring are arranged to be latched for an interval by connections to the grounded conductor 151.

Prior to automatic operation of the interpolator, the interpolator is set by depressing the push button SW2 (L291) which energizes relay 68CR. When this relay is energized, the normally closed contacts (L169) open and disconnect the latch line 151 from ground. At the same time, the normally open contacts 68CR (L158) in the circuit of relay 201CR are closed and this relay is energized.

At this time, the shift register ring is set as previously described and solenoid driver SD1 is turned on along with solenoid drivers SD18 through SD32. Therefore, the even line 150 is at ground potential and, with relay 201CR energized, its contacts in the energizing circuit of relay 202CR (L159) are closed and relay 202CR is now energized along with relay 201CR. The set relay 68CR is now deenergized by releasing push button SW2. Its contacts 68CR (L169) in the latch line 151 make before those in the circuit of relay 201CR (L158) break. Therefore, the ground is returned to the latch line 151 before the relay 201CR can be deenergized by the deenergization of the set relay 68CR. The relay 202CR also is latched energized. Thus, prior to the starting of the automatic interpolation, the relays 201CR and 202CR are both energized. Relay 203CR is conditioned for energization since the contacts 202CR (L161) in its energizing circuit are held closed.

With the start of an automatic interpolation operation, the third stage of the interpolator begins to cycle. The relays in the second stage remain as set until the start of the second half cycle in the third stage. At that time the solenoid driver SD17 is turned on and the solenoid driver SD1 is turned off. This terminates the ground pulse on the even line 150 and initiates the ground pulse on the odd line 149. Relay 203CR is immediately energized and latched while relay 201CR is deenergized since the normally closed contacts of relay 203CR (L158) open and break the latch circuit to relay 201CR. Relay 202CR remains latched in and relay 204CR is conditioned for energization by the closing of the contacts of relay 203CR (L163) in the pick-up circuit of relay 204CR. At the end of the first complete cycle of the third stage, the solenoid driver SD1 is turned on and the solenoid driver SD17 is turned off. Therefore, the even line 150 is grounded and the odd line 149 is open circuited. Relay 204CR is now energized and relay 202CR is dropped. Relay 203CR remains latched in and the next relay in the ring, i.e., relay 205CR, not shown, is conditioned for energization at the next ground pulse on the odd line 149.

The above-described operation of the second stage relay ring continues during repeated cycling of the interpolator. The relays are successively energized odd to even to odd from relay 201CR to relay 232CR. When relay 232CR is energized, it conditions relay 201CR for energization with the closing of the contacts 232CR (L157). At the next odd pulse after relay 232CR is energized, relay 201CR is energized to start the cycle around the ring again. As long as the pulses are supplied to the shift register to drive the third stages of the X and Y-axis interpolators, the second stages of the interpolators will continue to cycle in synchronism with the shift register but at a 16 to 1 reduction in cycle speed.

With the cyclic operation of the second stage relay ring, two of the relays will always be energized at a time, the relays being so matched and controlled that as one is energized, the second previous one is dropped out. From the above-described cyclic operation of the ring, it can be seen that the energization of the relays will step around the ring circuit in a pattern as follows: relays 201CR, 202CR; relays 202CR, 203CR; relays 203CR, 204CR; relays 232CR, 201CR; relays 201CR, 202CR, etc. The pattern of energization of the relays will continue in the above-described order until the interpolator is stopped.

In the preferred form of the interpolator, the contacts between the second and third interpolator stages are dry reed relay contacts. A relay of this type is shown and described in U.S. Patent 2,289,830 granted July 14, 1942, to Bell Telephone Laboratories, Inc. on application by W. B. Ellwood. In FIG. 8, it is shown how such reed relays are connected to operate with the second stage relay ring. The coils of the reed relays 201CR–X, 201CR–Y for the X-axis and Y1axis interpolators are connected in parallel with the relay 201CR of the relay ring. The coils 201CR–X and 201CR–Y are not energized until contacts of relays 201CR and 231CR are both closed. The contacts of relay 231CR close only after relay 231CR, the second previous relay before relay 201CR, is deenergized. This eliminates shorting of the windings in the second stage by the output switching. Each of the relays in the second stage relay ring will have reed relays connected in a similar manner to control the connection between the second and third stages. The reed relays 201CR–232CR shown in FIG. 11 may also be of the dry reed type disclosed in the Ellwood patent, No. 2,289,830.

The effect of the cycling of the second stage relay ring as applied to the X-axis interpolator can be seen in FIGS. 2c and 2d. The vertical conductors 98, 99, 100, 101 between the second and third stages are connected to the output taps of the second stage by closing of the contacts of the relays 201CR–X through 232CR–X. Conductors 98, 99 are connected to the upper end and lower end of the third stage transformer T9 by conductors 102, 103 respectively. Likewise, conductors 100, 101 are connected to the upper end and lower end of the transformer T10 by conductors 104, 105, respectively. With the contacts 201CR–X (L91, L93) closed, the upper end of the transformer T9 is connected by conductor 98 to the top tap on the second stage A-bridge transformer winding while the lower end of the transformer T9 is connected by the conductor 99 to the second tap from the tap on this winding. Also, since the contacts 202CR–X, (L92, L94) are closed, the upper end of the transformer T10 is connected by the conductor 100 to the second tap of the second stage A-bridge transformer winding, and the lower end of the transformer T10 is connected by the conductor 101 to the third tap of this winding. At the end of the first half cycle of the shift register, the relay 317CR will be energized to begin the scan of the transformer T10 and the second stage relay ring will be advanced to energize relays 202CR and 203CR together. The second and third taps of the second stage will continue to be connected across the transformer T10 but now the third and fourth taps of the second stage A-bridge transformer winding will be connected across the transformer T9 in readiness for the first half of the second cycle of the shift register. With the second stage of the interpolator so connected to the third stage, the input to the third stage will be connected to successive pairs of output taps on the second stage winding. This pattern will continue with additional cycling of the third stage of the interpolator. There will always be three successive output taps of the second stage connected across the ends of the third stage transformers T9 and T10. The middle tap of the three will be common to one end on both of these transformers. In this manner, each of the sub-spans of the second stage is connected to the third stage where it is further divided into sixteen third stage sub-spans. Likewise, it can be seen that in the cycling of the second stage relay ring, each full second stage span connected across the input leads to transformers T5, T6 and T7, T8 is divided into sixteen second stage sub-spans.

FIRST STAGE SWITCHING

A set of first stage relay rings are cyclically operable to connect the second stages of the X- and Y-axis interpolators to the first stages thereof. By the reed relays 101CR through 128CR of these first stage rings the contacts of which may be closed in selected combinations, the first stage spans may be divided into two, four, or eight first stage sub-spans corresponding to coarse, medium and fine granularity, respectively. These first stage sub-spans are connected across the second stage bridges to provide the second stage input spans.

There are three such rings, one for each of the three granularities involved. The relay ring for the fine granularity includes relays 101CR to 116CR, inclusive; the relay ring for the medium granularity includes relays 117CR to 124CR, inclusive; and the relay ring for the coarse granularity includes relays 125CR to 128CR, inclusive. Each ring is further divided into A-bridge and B-bridge sections.

The first stage relay rings are shown in FIGS. 12a, 12b. The vertical conductor 153 at the left side of the drawings is connected to the ground side of relay 225CR in the second stage relay ring, and the vertical conductor 154 immediately to the right thereof is connected to the ground side of the relay 203CR in the second stage relay ring. These conductors 153, 154 are the odd and even relay energizing lines, respectively, and are alternately pulsed with a ground connection as the second stage switching is cycled, each being pulsed once for each complete cycle of the second stage relay ring. The latch line 155 is connected to ground through normally closed contacts 68CR (L215) of the interpolator set relay. Relays 46CR, 47CR and 48CR (L217–L224) have normally open contacts (L192–L195) connected between a —24 volt supply terminal (L192) and vertical conductors 159, 160 and 161. Similarly relays 49CR, 50CR, and 51CR (L226–L232) have normally open contacts (L170–L173) connected between a —24 volt supply terminal (L170) and vertical conductors 156, 157 and 158. Unless relays 46CR–51CR are energized, the respective conductors 156 through 161 connected to contacts thereof will be open circuited and this prevents the relays connected to those conductors from being energized. The relays 46CR through 51CR control the interpolator granularity which will be described subsequently.

Prior to the start of an automatic cycle, all stages of the interpolator must be set, including the first stage. Therefore, relay 68CR is energized and contacts 68CR (L171) are closed to energize one of the relays 101CR, 117CR or 125CR. Assume that the A-bridge fine granularity relay 51CR is energized and its contacts (L170) closed. Relay 101CR will then be energized upon closing of the contacts 68CR (L171). The normally closed contacts 68CR (L215) in the latch line 155 are opened to break the latch circuit and deenergized any of the other first stage relays that might previously have been latched energized. At this same time, the shaft register and the second stage relay ring are also set, as described earlier herein, to bring the entire interpolator into starting alignment. The relay 68CR is then deenergized and the latch line 155 is connected to ground. The relay 101CR is latched in through its contacts 101CR (L171), the normally open contacts 68CR (L171) not opening until the normally closed contacts 68CR (L215) have closed. The contacts 101CR (L174) in the energizing circuit of relay 102CR are closed but relay 102CR is not immediately energized. Interpolator cycling is started and thereafter the second stage relay ring will be stepped to energize the relay 203CR to which the even relay energizing line 154 of the first stage is connected. An energizing circuit for relay 102CR is thereby completed from line 154 through contacts 101CR (L174). Once energized, relay 102CR latches in through its contacts 102CR in L175. Relay 101CR will remain energized through its latch circuit to latch line 155. The relay 103CR will be conditioned for energization when the contacts of relay 102CR (L178) close, but it will not immediately be energized. The second stage relay ring will continue to cycle and, at the time the relay 225CR, to which the odd relay energizing line 153 is connected, is energized, the relay 103CR will be energized. Relay 101CR will be deenergized when the contacts of relay 103CR, in its latch circuit (L171), open. Relay 102CR will remain energized. Relay 104CR will be conditioned for energization but will not be picked up until the second stage relay ring has cycled around to energize relay 203CR again.

The granularity selection is so arranged that it will not change during the interpolation of a first stage span. Therefore relays 104CR, 105CR, 106CR, 107CR and 108CR of the first stage relay rings will be energized in succession in the same manner as relays 101CR through 104CR. Just prior to the crossover from the first stage A-bridge output to the B-bridge output, the B-bridge granularity will be set. Assume, also, that it is set for fine granularity and that the contacts 48CR (L192) are closed. Therefore, relay 109CR will be conditioned for energization when the relay 108CR is energized. Relay 109CR will pick up when the odd line 153 is at ground. This occurs when the second stage relay ring has cycled to energize the relay 225CR. During cycling through the B-bridge, the granularity will remain set and relays 109CR through 116CR will be energized in succession and as each new relay is energized, the second previous relay will be deenergized.

At the end of each first stage span, i.e., at the end of the half cycle through the A-bridge or at the end of the half cycle through the B-bridge, a new granularity may be selected. Assume that during the last part of the cycle through the B-bridge section of the fine granularity relay ring i.e., relays 109CR through 116CR, the granularity selection is changed and the contacts of the medium granularity relay 50CR in L171 are closed and the contacts of relay 51CR in L170 are opened as also are those of the relay 49CR in L173. The medium granularity conductor 157 is now connected to the —24 volt supply. When relay 116CR is energized at the end of the last half of the cycle through the fine granularity relay ring, the relay 117CR will be conditioned for energization at the start of the next cycle through the A-bridge. When relay 225CR of the second stage is next energized and the odd line 153 is at ground, relay 117CR of the A-bridge medium granularity relay ring will be energized. Relay 116CR will remain latched in but the relay 115CR will be deenergized due to the opening of contacts 117CR (L210) in its latch circuit. Relay 118CR will be conditioned for energization at the next ground pulse on the even line 154. When this next pulse occurs, relay 118CR will pick up and latch. Relay 116CR is deenergized by the opening of the normally closed contacts 118CR (L214). Relay 119CR is conditioned for energization. Relays 119CR and 120CR of the A-bridge medium granularity relay ring will be energized in succession and the second preceding relay of the medium granularity ring will be denergized each time a succeeding relay is energized.

Assuming now that medium granularity also has been selected for the next span, i.e., for the B-bridge and that the medium granularity relay 47CR is energized and relays 46CR and 48CR are deenergized, the medium granularity relay ring will continue to cycle through the relays 121CR to 124CR in the same manner as described above in connection with relays 117CR through 120CR. As each new relay is energized, the second preceding relay of the ring will be deenergized. When the relay 124CR is energized, one of the relays 101CR (fine), 117CR (medium), or 125CR (coarse) of the A-bridge section is conditioned for energization.

Assume that coarse granularity now has been selected for the A-bridge and that relay 49CR is energized to close its contacts in L173. Hence, relay 125CR will be conditioned for energization at the next ground pulse on the odd line 153. When it occurs, relay 125CR will be energized and the relay 123CR will be deenergized by the opening of normally closed contacts 125CR (L210) in its latch circuit. Relay 126CR will be conditioned for energization by the next ground pulse on the even line. Assuming that coarse granularity is selected for the B-bridge, the contacts 46CR (L195) will be closed and relay 127CR will be conditioned for energization when relay 126CR is energized. In this manner, the coarse granularity ring of relays 125CR through 128CR will be successively energized through a complete cycle.

Any one of the three granularities may be selected for either of the first stage spans, i.e., the A-bridge or the B-bridge, and the change from one to the other will be made at the point of changeover from one bridge to the other. The changeover from one granularity to another in one bridge cannot be made in the middle of the interpolation of the span on that bridge.

In the preferred form of the invention, the contacts between the first and second interpolator stages are also dry reed relay contacts. As shown in FIG. 9, the coils of these relays are connected for operation with the relays of first stage relay rings. Coils of reed relays 102CR–X, 102CR–Y, 118CR–X, 118CR–Y, 126CR–X, 126CR–Y are connected in parallel with relays 102CR, 118CR, 126CR of the rings. The reed relay coils are energized when the respective parallel relay of the ring is energized to close its normally open contacts and when the contacts of relays 116CR, 124CR, 128CR also are closed as shown. These latter contacts are those of the second previous relay in each of the respective granularity relay rings of the first stage switching. Each of the other relays in the rings have similarly connected reed relays. By so connecting and energizing the particular relays which furnish the actual contacts included in the interpolators, shorting of the first stage bridge windings is prevented.

As shown in FIGS. 2a and 2b, the cycling of the first stage relay rings will connect three outputs at a time from the sub-spans of the first stage to the two end points and mid-point of the second stage A-bridge or B-bridge. The three vertical conductors 86, 87, 88 are connected by leads 92, 93, 94 to the end points and midpoint of the second stage A-bridge which includes transformers T5 and T6. The contacts of the odd-numbered X-axis relays in the first stage relay rings, when closed, connect these conductors to the output taps of the first stage bridges. The vertical conductors 89, 90, 91 are connected by leads 95, 96, 97 to the end points and midpoint of the second stage B-bridge, including transformers T7 and T8. These conductors are connected to the output taps of the first stage bridges by the even-numbered X-axis relays of the first stage rings.

When relay 101CR–X is energized, its contacts (L3, L7, L9) close to connect the first, second and third taps of the first stage A-bridge winding to the second stage A-bridge via conductors 86, 87, 88. When relay 102CR–X is energized, its contacts (L10, L11, L16) close to connect the third, fourth, and fifth taps of the winding to the second stage B-bridge via conductors 89, 90, 91. If relay 103CR–X is energized, then the fifth, sixth, and seventh taps of the first stage winding are connected to the second stage A-bridge by conductors 86, 87, 88. Thus it can be seen that as the relays 101CR through 116CR are energized, the taps of the first stage bridge will be connected three at a time to first one and then the other of the second stage bridges by the X-axis relays. The setting of the odd relays to connect the first stage bridges to the second stage A-bridge may be done at any time that the output is being taken from the second stage B-bridge. Thus, the energization of the odd relays occurs when relay 225CR of the second stage relay ring is energized. Likewise, the even numbered relays of the first stage relay rings may be set at any time the second stage output is being taken from the second stage A-bridge. Therefore, the even relays of the first stage are energized when relay 203CR of the second stage is energized.

In medium granularity, the relays 117CR–X through 124CR–X connect the first and second stages together. When relay 117CR–X is energized, the first, third, and fifth taps of the first stage winding are connected to the second stage A-bridge. When relay 118CR–X is energized, the fifth, seventh, and ninth taps of the first stage winding are connected to the second stage B-bridge. Thus, it can be seen that the sub-span derived from the first stage in medium granularity is larger than in the case of fine granularity. The fine granularity ring will break each first stage span into eight sub-spans for connection to the second stage. The medium granularity ring will divide each first stage span into four sub-spans. The coarse granularity ring of relays 125CR through 128CR will divide the first stage spans into only two sub-spans. Thus when relay 125CR–X is energized, the first, fifth, and ninth first stage taps will be connected to the second stage A-bridge. With relay 126CR–X energized the ninth, thirteenth, and seventeenth taps will be connected to the second stage B-bridge. The relays 127CR and 128CR will likewise break the first stage B-bridge into two sub-span outputs.

GRANULARITY SELECTION

The selection of successive, alternate, or multi-spaced taps on the first stage winding depends upon the first stage relay ring selected by the granularity control circuit. Granularity may be defined as the number of discrete steps in the output voltage from the interpolator for each span input to the first interpolator stage from the information stores. The span information supplied to the first stage from the stores is the voltage interval, or voltage difference, from end point to end point one one of the first stage bridges. In the control system being described, the interpolator granularity may be changed to produce 512, 1024, or 2048 discrete steps in the interpolator output, i.e., $16 \times 16 \times 2$, 4 or 8. The granularity selection is determined automatically from the span lengths applied as inputs to the first stage. Since the machine is controlling movement along two axes, the greater of the two spans, i.e., the X-axis span and the Y-axis span, connected to the interpolators controls the granularity for both interpolators.

The granularity selection circuit for both interpolators 38, 39 is shown in FIG. 13. The enclosed block 162 represents a plurality of electronic circuits of the synchronizing network type which control the selection of granularity in the X- and Y-axis interpolators. There is one synchronizing network for each first stage bridge in the interpolators, in other words, two networks for each interpolator in the system. The pairs of relay contacts 401CR and 402CR (L217–L219) are the synchronizing network relay contacts for the B-bridge of the X-axis interpolator. The synchronizing network for the A-bridge of the X-axis interpolator comprises the pairs of relay contacts 405CR and 406CR (L227–L229). The granularity of the A- and B-bridges associated with the Y-axis is determined by the pairs of relay contacts 403CR, 404CR (L220–L222), and 407CR, 408CR (L230–L232), respectively. Each of the pairs of contacts has a normally open and a normally closed contact. As the contacts are shown herein, circuits are completed from lead 175 to the coarse selection relays 46CR and 49CR, except for relay contacts 53CR (L223) and 54CR (L225). As the contacts 401CR through 408CR are selectively closed, the circuits may be completed through the granularity selection block to any of the other relays 47CR, 48CR, 50CR, and 51CR.

Figure 10:
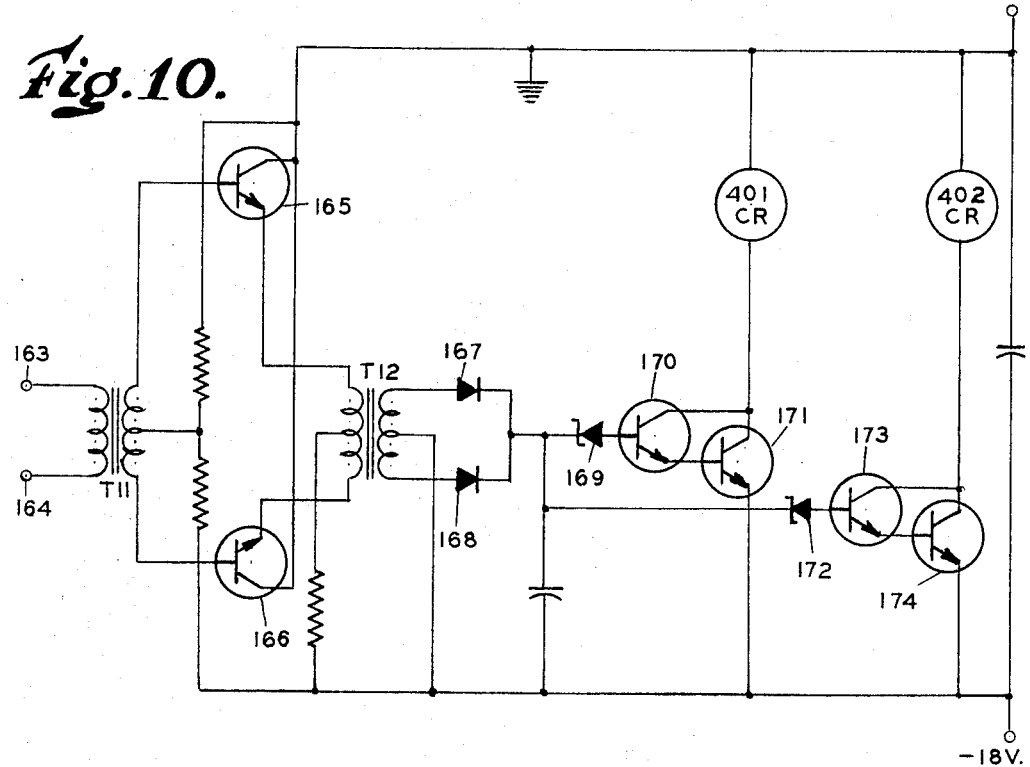
FIG. 10 is a wiring diagram of a synchronizing network.

In FIG. 10 is shown a wiring diagram of one of the four synchronizing networks required for two axis operation. The one shown in that figure operates the X-axis, B-bridge granularity relays 401CR and 402CR. Each of the pairs of relays 403CR, 404CR; 405CR, 406CR; and 407CR, 408CR will have an identical electronic unit controlling their operation to cause their contacts to be set in the proper state. The input for each network is taken from across the ends of the first stage transformer winding for each bridge. Thus, in the case of the unit shown in FIG. 10, the input terminals 163, 164 are connected to the ends of the transformer winding associated with the B-bridge of the X-axis interpolator as shown in FIG. 2b. Therefore, the voltage across the input terminals is an alternating signal which induces a voltage in the secondary of the coupling transformer T11 which is proportional to the span length impressed across the B-bridge of the X-axis interpolator. The voltage from the secondary of the transformer is amplified by the transistors 165, 166 and coupled through the transformer T12 to the diodes 167, 168 which effect full-wave rectification of the signal. The output from the diodes is thus a direct current signal which will vary in level as the span length signal across the input terminals varies. The Zener diode 169 conducts and passes the signal to an amplifying circuit comprised of transistors 170, 171 when the output from the diodes reaches a first predetermined level. The amplifying transistors provide the power for energizing the coil of relay 401CR.

A second Zener diode 172 is connected in parallel with the diode 169 and conducts and passes a signal to an amplifier comprised of transistors 173, 174 when the output from the rectifiers 167, 168 reaches a second higher predetermined level. The transistors provide the drive required to energize the coil of relay 402CR. Therefore, in accordance with the span length signal at the input terminals, neither, one, or both of the relays 401CR, 402CR will be energized and the same will hold true for the relays 403CR and 404CR which control the granularity selection for the Y-axis. These relays are arranged in a circuit like FIG. 10 and function in the same manner as relays 401CR and 402CR, respectively. It will be noted that when neither of the relays 401CR or 402CR is energized (short span), the coarse granularity relay 46CR will be energized through the normally closed contacts 401CR, 402CR (L217). When relay 401CR only is energized (medium span), the medium granularity relay 47CR will be energized through the contacts 402CR (L217) and 401CR (L218). When both relays 401CR and 402CR are energized (long span), the fine granularity relay 48CR will be energized through contacts 402CR (L219). A similar action will take place when neither, one, or both of the Y-axis relays 403CR, 404CR are energized.

An energizing circuit for the B-bridge granularity relays 46CR, 47CR, 48CR is completed only when the lead 175 (FIG. 13) is grounded and the contacts of relay 53CR are closed. The lead 175 is connected to the ground side of the relay 231CR (FIG. 11) in the second stage switching circuit and is thereby connected to ground potential for two counts of each of the second stage cycles. Relay 53CR is energized for the half cycle of the first stage relay ring during which the A-bridge of the first stage is connected to the second stage bridges. The contacts 58CR (L235) close at the time the top of the first stage A-bridge is connected to the second stage since the conductor 176 on the ground side of relay 58CR (L239) is connected to the energizing circuit of relays 101CR, 117CR, and 125CR (FIG. 12a) in the first stage relay rings. Relay 15CR (L241) is also energized to close its contacts (L235) while relay 58CR is energized since it is connected through the lead 177 to the energizing circuit of relay 201CR (L157) in the second stage relay ring and that relay is energized for a brief period with relays 101CR, 117CR, or 215CR, of the first stage relay rings. Furthermore, the relay 53CR can only be picked up when either of the lines 178, 179 is grounded. These lines are connected to the outputs of the solenoid drivers SD2 and SD3 each of which is grounded during the period that relay 201CR is energized. Therefore since all three of the conditions required to energize relay 53CR will occur simultaneously, the relay 53CR will be energized and latched in through the normally closed contacts of relay 54CR.

It can be seen that the B-bridge granularity circuit will be pulsed several times by grounding of the lead 175 (L225) during the time that the A-bridge of the first stage is connected to the second stage bridges. The last pulse will occur near the end of the cycle of the second stage relay ring just prior to the change from the A-bridge to the B-bridge. Thus, the final setting of the B-bridge granularity will be made just prior to the connection of the first stage B-bridge to the second stage bridges. Once the selection is made and the interpolation is changed to the bridge which has been set, the granularity will remain the same for the entire span on that bridge.

The relays 46CR through 51CR require a full flux unit in their coils to energize but may be held in the energized condition by only a half flux unit. For this purpose, a resistor R25 is included in the latch circuit of each of these relays to produce a 12-volt drop between the ground line and the terminal on the ground side of the relay. This results in only a half flux unit being available for the latch circuits. The relays 46CR, 47CR, 48CR can only be energized through the parallel circuits in the granularity block 162. Once energized, however, the relays will remain energized by virtue of the latch circuits.

The A-bridge granularity relays 49CR, 50CR, 51CR are of the same type as the B-bridge relays 46CR, 47CR, 48CR and are energized and latched in the same way except that a relay 54CR is utilized instead of relay 53CR. Relay 54CR is energized during the time that the first stage B-bridge is connected to the second stage bridges. The energization of relay 54CR occurs when the solenoid drivers SD2, SD3 and the relays 15CR and 60CR are all energized at the same time. Relay 60CR is connected through the lead 180 to the energizing circuit of relays 109CR, 121CR and 127CR one of which is energized when the top of the first stage B-bridge is connected to the second stage bridges.

At the time that the granularity relays for the B-bridge are pulsed for energization, the axis for which finest granularity is required determines which granularity will automatically be selected. The latch circuit of coarse granularity relay 46CR contains normally closed contacts of medium and fine relays 47CR and 48CR. If either of these relays is energized with relay 46CR, the latch circuit for relay 46CR will be open and, at the end of the selection pulse, relay 46CR will be deenergized. The medium granularity relay 47CR has a latch circuit which includes normally closed contacts of fine granularity relay 48CR. If relays 47CR and 48CR are energized simultaneously, only the fine relay 48CR will latch. The latch circuits of all the B-bridge relays are connected through normally closed contacts (L224) of relay 58CR. The relay 58CR is only energized while the relay 101CR in the first stage relay ring is energized as described. Therefore, the latch for the B-bridge relays will be dropped when the interpolator is operating at the top of the first stage A-bridge. This prepares the relays for resetting prior to the next use of the B-bridge.

The control circuits for the A-bridge granularity selection relays 49CR, 50CR, 51CR are operated on the same principle as the B-bridge control circuits. The coarse relay 49CR latches in through contacts of the medium and fine relays 50CR, 51CR and the medium relay 50CR latches in through contacts of the fine relay 51CR. All of the A-bridges relays 49CR, 50CR, 51CR latch in through normally closed contacts (L233) of relay 60CR which is energized, as above described, when one of the relays 109CR, 121CR, 127CR is energized.

From the foregoing descriptions of the first stage switching and granularity selection, it can be seen that the selection of the particular relay ring for use in the first stage switching circuit is dependent upon the energization of one of the relays 46CR through 51CR. Which of these relays is energized and latched depends upon the difference between the analog voltages representing the end points of the span, these voltages being supplied to the interpolators from the information stores. The selection of a particular granularity of the interpolator outputs is therefore seen to be automatically determined by the interpolartor control circuitry.

STORES SWITCHING AND READER CONTROL

The sequential connection of the information stores to the ends of the first stage bridges in the interpolators is controlled by the operation of the relays 29CR through 34CR, FIG. 14a. Each of these relays requires a full flux unit in its coil for energization but each may be latched in, or maintained in the energized condition, by a half flux unit in the coil. The relays 29CR, 30CR, 31CR are operated to connect the A-bridges to the stores while the relays 32CR, 33CR, 34CR are operated to connect the B-bridges to the stores. As the interpolators are operated, first the A-bridge relays are pulsed and then the B-bridge relays are pulsed. The A-bridge relays are then pulsed again followed by the B-bridge relays. The relays 29CR through 34CR must therefore function as two parallel relay rings which are cyclically operated a step at a time. However, the relay rings must be stepped alternately since the bridges in the first interpolator stages are operated in a hand-over-hand manner.

It will be recalled that for the purpose of initially setting the interpolator, the relay 68CR is energized and its normally closed contacts (L251) are opened to disable latch circuits and to deenergize all of the relays 29CR through 34CR. The normally open contacts (L255) of relay 68CR are closed to energize the relays 29CR and 34CR. When the set relay 68CR is deenergized, its normally closed contacts (L251) provide a latch circuit to hold relays 29CR and 34CR energized. The contacts (L251, L255) of relay 68CR are form D contacts, i.e., make-before-break, to insure that relays 29CR and 34CR are not dropped before the latch is restored. With relay 29CR energized and relay 68CR deenergized, the half flux unit for holding relay 29CR energized is provided through the contacts of relays 68CR, 30CR, and 29CR (L252) and a resistance R26. A similar latch is provided to hold relay 34CR energized.

With relay 29CR energized, its contacts (L256) in the energizing circuit of relay 30CR are closed. With the start of an automatic interpolation, the A-bridge stores selection relays will first be pulsed. The relay contacts 77CR (L251) will be closed to gate a pulse to the A-bridge relays and energize relay 30CR through the relay contacts 29CR and 31CR (L256). A latch is provided for relay 30CR through the contacts of relays 30CR, 31CR (L257) and a resistance R26. The diodes 181 will hold the relays 29CR and 30CR simultaneously energized for the duration of the pulse to keep the latch and energizing circuits of relay 31CR open during the pulse produced by relay 77CR. The relay 31CR might otherwise be energized and latched, thus moving the A-bridge stores relay ring ahead more than one step. At the end of the pulse, relay 29CR will drop out while relay 30CR will be held energized through its latch circuit.

Since the interpolators operate first from one first stage bridge and then from the other, the next pulse to the stores relays will be gated to the B-bridge relays 32CR, 33CR, 34CR by the closing of relay contacts 76CR (L262). Since relay 34CR was initially set in the energized condition, the relay 32CR is conditioned to be energized by this pulse. Therefore, it is now picked up and latched. The latch circuit for relay 32CR includes a resistance R26 and contacts of relays 33CR and 32CR. The diodes will hold relays 34CR and 32CR simultaneously energized during the pulse to prevent the circuit from skipping a relay. Relay 32CR will then remain latched in the energized condition at the end of the pulse while relay 34CR will be deenergized.

Pulses will continue to alternate between the A-bridge and B-bridge stores relays to alternately step each of the relay rings. The order of the energization after the initial setting of the relays will be as follows: 30CR, 32CR, 31CR, 33CR, 29CR, 34CR, 30CR, 32CR, and so on during interpolation. The relays have contacts which serve to connect the input conductors 81, 82 and 83 (FIGS. 2a and 2b), and thereby the stores 30, to the ends of the first stage transformer windings in the proper cyclic order.

The pulses which are gated to the stores selection relays 29CR through 34CR are produced by the momentary operation of the relay 24CR. Relay 24CR has normally open contacts (L251) in series with contacts of the relays 75CR and 77CR, and with contacts of relay 76CR (L262) which are in parallel with the contacts of relay 77CR. Before the pulses produced by the relay 24CR are effective, the contacts of relays 75CR and 77CR (L251) must be closed.

Relay 77CR is energized whenever relays 22CR and 54CR are both energized at the same time. The relay 54CR is energized while the B-bridge of the first stage is connected to the second stage bridges as described in the section on granularity selection. The relay 22CR (L243) is energized when relay 100CR (L299) is energized along with either relay 74CR or 75CR. Relay 100CR is energized when the reader encounters a channel eight code in the tape which closes the contacts 188 (L299) and turns on the solenoid driver SD33 to signal the end of a block of information. Thus, relay 100CR will be energized at the end of each reading cycle and will remain so until the beginning of the next reading cycle. The relay 74CR (L292) is energized when relay 227CR in the second stage relay ring (FIG. 11) is energized at the same time that the relays 61CR (L281) and 43CR (L279) are energized. Relay 43CR is the parabolic interpolation relay and is energized and latched when the reader contacts 190 have been closed by miscellaneous coded information on the tape. Relay 43CR will be held energized through its latch circuit until a linear interpolation code is sensed on the tape. This will cause reader contacts 189 (L277) to close and energize linear interpolation relay 42CR. This will cause contacts 42CR (L280) to open and break the latch circuit for relay 43CR. Relay 61CR is energized by the connection of ground potential to its left side. This occurs when any one of the relays 102CR, 118CR, 126CR, 104CR, 110CR, 122CR, 128CR and 112CR in the first stage relay rings is energized since the left side of the relay 61CR is connected through leads 182–185 to the energizing circuits of these relays. Depending on granularity selection, one of these relays will be energized each time the interpolators are operating at a midpoint of one of the first stage bridges. Relay 61CR is the midpoint reading relay which signals that outputs of the first interpolators stages are connected at a midpoint. Relay 227CR will be energized at some time during the time that relay 61CR is energized. Thus, relay 74CR will be energized during the time that the first stage outputs are taken at the midpoints of the bridges. Relay 75CR is energized when relay 227CR is energized with relay 62CR. Relay 62CR is energized by the connection of ground potential to its left side which occurs when the first stage interpolator outputs are determined by an end point of one of the first stage bridges. The left side of the relay 62CR is connected to the energizing circuits of relays 102CR, 118CR, 126CR, 108CR, 120CR, 110CR, 122CR, 128CR, 116CR, and 124CR in the first stage relay rings by the conductors 182, 186, 184, 187. Depending on the granularity selection, one of these relays is energized when one of the first stage interpolators is operating at an end point thereon. Therefore, relay 22CR is energized when the first stage outputs are taken both around an end point and around a midpoint.

Since the contacts of relay 75CR (L251) are in series with the contacts of relay 24CR in the stores switching relay circuit, a pulse by relay 24CR will effect a change in the stores relays 29CR through 34CR only when the first interpolator stages are at an end point. The relay 24CR (L249) is in the reader control portion of the circuit which includes relays 23CR through 28CR FIGS. 14a, 14b. At the time that the A-store signal relay 77CR is energized, the relay 23CR is energized through relay contacts 26CR and 77CR (L246). When relay 23CR is energized, the relay 28CR is deenergized and the reader 25 is stopped, the relay 28CR being the reader control relay which signals the reader to go. Also, when relay 23CR is energized, relay 24CR is energized to pulse the stores switching relays. The time relays 25CR, 26CR pick up in succession after relay 24CR to provide a time interval before relay 27CR is energized to open its contacts (L248) in the latch circuit of relay 23CR which is then deenergized. Relay 24CR is dropped immediately thereafter to end the pulse to the stores switching relays. Relay 27CR is latched through relay contacts 22CR (L273) and remains latched only until relay 22CR is deenergized. This will occur when relay 28CR is energized to start the reader upon the deenergizing of relay 23CR. The reader contacts 188 (L299) will open and the relay 100CR will be deenergized. Relay 22CR will then drop out.

The relay 77CR will be energized only while the output of the first stages of the interpolators is taken from the B-bridges. During the first half cycle of the first stage relay rings, the output will be taken from the A-bridges and the stores connections to the B-bridges will be changed. Relay 53CR will be energized as described above in connection with the granularity selection circuit. Relay 76CR will be energized when relay 22CR is energized with relay 53CR. Relay 23CR will now be energized since contacts of relay 76CR (L262) are parallel to the contacts of relay 77CR (L251) in the energizing circuit of relay 23CR. Now the pulse to the stores selection relays 29CR through 34CR will be connected only to the relays 32CR, 33CR, 34CR.

From the foregoing description it can be seen that the A-bridge stores relay ring, 29CR, 30CR, 31CR, will be stepped one relay when the outputs from the first interpolator stage B-bridges are taken from the end points of the B-bridges. Also, the B-bridge stores relay ring, 32CR, 33CR, 34CR, will be stepped one relay when the outputs of the first interpolator stage A-bridges are taken from end points thereon. The stepping will occur just prior to the change over from one bridge to the other in the first stages.

It can also be seen that the tape reader 25 (FIG. 1) is operated when the outputs of the first stages are either at an end point or at a midpoint during parabolic interpolation. When linear interpolation is programmed, the relay 42CR (FIG. 14a) is energized with the closing of the contacts 189 as mentioned earlier. This opens the latch circuit to relay 43CR which drops out. Since relay 43CR is deenergized, relay 74CR will not be energized when the first stage switching is at a midpoint. Therefore, the relay 22CR is operated only at an end point and the reader 25 is caused to read at end points only. In addition the normally closed contacts of the relay 42CR (L24, L68) in the interpolator connections from the midpoint stores will be opened and there will be no midpoint analog connected to the midpoint of the first stage bridges. The result will be linear interpolation rather than parabolic interpolation.

While the invention has been described in connection with one possible form or embodiment thereof, it is to be understood that the present disclosure is illustrative rather than restrictive and that changes and modifications may be resorted to without departing from the spirit of the invention or the scope of the claims which follow.

What is claimed is:

1. Apparatus for producing signals suitable to control the displacement of a movable element comprising:
    (a) a source of input signals representing values of a function at relatively widely spaced intervals of a variable of the function,
    (b) interpolating means having a plurality of input terminals for receiving signals from said source and a plurality of output terminals which are greater in number than said input terminals for producing output signals which are representative of intermediate values of a function,
    (c) an output conductor,
    (d) means for selectively connecting said output terminals to said output conductor,
    (e) and static means for controlling the operation of said connecting means to connect said output terminals to said output conductor in a prearranged sequence and including
        (1) an electronic commutating device for sequentially operating said connecting means,
        (2) a variable frequency pulse generator,
        (3) and means for driving said commutating device at a rate proportional to the pulse rate of said generator.

2. The signal producing apparatus of claim 1 including:
    (a) means to provide a feed rate signal representative of the desired rate of displacement of said element,
    (b) and means for controlling the pulse rate of said generator in accordance with said feed rate signal.

3. The signal producing apparatus of claim 2 including:
    (a) means to provide a signal representative of the difference in amplitude between a pair of adjacent output signals,
    (b) and means to divide the feed rate signal by said difference signal before it is applied to said pulse rate controlling means to thereby maintain the feed rate of said element constant irrespective of changes in the difference between adjacent output signals.

4. The signal producing apparatus of claim 1 wherein said connecting means includes:
    (a) a pair of single pole, double throw switch contacts associated with each pair of adjacent output terminals, said contacts being of a make-before-break type so that at least one output terminal is always connected to said output conductor.

5. The signal producing apparatus of claim 4 including
    (a) additional pairs of make-before-break switch contacts which, with said previously mentioned switch contacts, are arranged in a binary tree with two pairs of contacts connected to the end of each branch to thereby enable a make-before-break connection between each pair of coordinate branches of the tree.

6. The signal producing apparatus of claim 1 wherein said electronic commutating device includes:
    (a) a shift register having a plurality of stages each settable to a set or reset condition, said stages being connected to form a ring,
    (b) and means associated with each stage of said register for selectively operating said connecting means in accordance with the set or reset condition of its associated stage.

7. The signal producing apparatus of claim 6 wherein said connecting means includes:
  (a) a pair of single pole, double throw switch contacts associated with each pair of adjacent output terminals, said contacts being of make-before-break type so that at least one output terminal is at all times connected to said output conductor.

8. The signal producing apparatus of claim 7 including:
  (a) additional pairs of make-before-break switch contacts which, with said previously mentioned switch contacts, are arranged in a binary tree with two pairs of contacts connected to the end of each branch to thereby enable a make-before-break connection between each pair of coordinate branches of the tree.

9. The signal producing apparatus of claim 8 including:
  (a) means to place equal numbers of adjacent stages of said shift register in set and reset states whereby one half of said switch contacts will be progressively operated and held operated during a half cycle of operation of said shift register.

10. Apparatus for varying the granularity of interpolation between values of a function at relatively widely spaced intervals of a variable of the function comprising:
  (a) a source of electrical input signals representing coordinate values of the function in at least two dimensions at each of said intervals,
  (b) an interpolator for each dimension of the function, each interpolator including:
      (1) a first stage having input terminals for receiving input signals from said source, a plurality of output terminals, and impedances for connecting said output terminals with said input terminals to cause signals to be set up at said output terminals representative of intermediate values of the function,
      (2) a second stage having input terminals and a plurality of output terminals,
      (3) and means for connecting each input terminal of each of said second interpolator stages with an output terminal on its associated first stage,
  (c) and means for selectively controlling the connecting means for each of said interpolators to cause the input terminals of each of said second stages to be connected to the output terminals on its associated first stage in one of a plurality of patterns including adjacent spacing, alternate spacing and multiple spacing in accordance with which ever difference between adjacent values of the function in each dimension as measured by the corresponding input signals is the largest.

11. Apparatus for continuously controlling the displacement of a machine element in response to an input function comprising:
  (a) a plurality of tapped impedances for producing electrical analog signals of varying magnitude which are representative of the input function,
  (b) means for causing said machine element to be displaced in response to said signals,
  (c) pulse operated means for controlling the rate of production of said signals,
  (d) a variable frequency pulse generator for producing pulses for said pulse operated means,
  (e) and means for causing the frequency of said pulse generator to vary inversely as the magnitude of said signals, whereby said element will be caused to move at a constant rate regardless of variation in the magnitude of said signals.

12. Apparatus for continuously controlling the direction and rate of displacement of a machine element in response to an input function comprising:
  (a) a plurality of tapped impedances for producing electrical analog signals of varying magnitude which are representative of the input function,
  (b) means for causing said machine element to be displaced in response to said signals,
  (c) pulse operated means for controlling the rate of production of said signals,
  (d) a variable frequency pulse generator for producing pulses for said pulse operated means,
  (e) means for producing an analog voltage proportional to the desired rate of displacement of said element,
  (f) and means for causing the frequency of said pulse generator to vary inversely as the magnitude of said electrical analog signals and directly as the magnitude of said analog voltage whereby said element will be caused to move at the desired rate regardless of variations in the magnitude of said electrical analog signals.

13. Apparatus for continuously controlling the direction and rate of displacement of a machine element in response to an input function comprising:
  (a) a plurality of tapped impedances for producing electrical analog signals of varying magnitude which are representative of the input function,
  (b) means for causing said machine element to be displaced in response to said signals,
  (c) pulse operated means for controlling the rate of production of said signals,
  (d) means to produce an analog voltage proportional to the desired rate of displacement of said element,
  (e) means to divide said voltage by the magnitude of said analog signals to produce a control signal proportional to the quotient thereof,
  (f) means controlled by said control signal to produce pulses at a rate proportional to the magnitude thereof,
  (g) and means for applying said pulses to said pulse operated means and thereby cause said analog signals to be produced at a rate which varies inversely as their magnitude and directly as the magnitude of said analog voltage, whereby said element will be caused to move at the desired rate regardless of variations in the magnitude of said analog signals.

14. The apparatus of claim 13 wherein said dividing means includes:
  (a) circuit means for progressively varying the attenuation of said analog voltage in accordance with changes in the magnitude of said analog signal.

15. The apparatus of claim 14 wherein said circuit means includes:
  (a) a load resistor,
  (b) a chain of parallel connected resistors connected across said load resistor,
  (c) a diode connected in series with each of said resistors along the chain,
  (d) means to apply a progressively increasing bias to the diodes along the chain,
  (e) and means to progressively unblock the diodes as said analog signal increases in magnitude to insert additional resistors in parallel with said load resistor.

16. Apparatus for continuously controlling displacement of a machine element in response to values of a function at relatively widely spaced intervals of a variable of the function comprising:
  (a) a sourec of electrical input signals representing coordinate values of the function in a plurality of dimensions at each of said intervals,
  (b) interpolator means associated with each dimension of the function for receiving a plurality of input signals from said source and producing a greater number of output signals representative of intermediate values of the function,
  (c) means associated with each of said interpolator means for receiving said output signals and causing said element to be displaced in response thereto,
  (d) pulse operated means for controlling the rate at which said output signals are delivered to said receiving means,
  (e) and means for delivering pulses to said pulse operated means at a rate inversely proportional to the spacing between said intermediate values of the function as represented by the vectorial sum of the output signals for each dimension of the function to thereby maintain the rate of movement of said element constant regardless of the spacing between said intermediate values of the function.

17. The apparatus of claim 16 including:
   (a) means for producing an analog voltage proportional to the desired rate of displacement of said element,
   (b) and wherein said delivering means furnishes pulses to said pulse operated means at a rate that varies inversely as the magnitude of the spacing between said intermediate values of the function and directly as the magnitude of said analog voltage thereby causing said element to move at the desired rate regardless of variations in the spacing between said intermediate values of the function.

18. Apparatus for varying the granularity of interpolation between the amplitudes of a plurality of input signals comprising:
   (a) a source of electrical input signals representing values of a function at relatively widely spaced intervals of a variable of the function,
   (b) a multi-stage interpolator having:
      (1) a first stage including input terminals for receiving input signals from said source and a plurality of output terminals for providing signals representative of intermediate values of the function,
      (2) and a second stage having input terminals and a plurality of output terminals,
   (c) pulse operated means for connecting the input terminals of said second stage with different groups of output terminals of said first stage,
   (d) and means responsive to the difference between adjacent values of the function as measured by the input signals associated therewith for causing said pulse operated means to connect said second stage input terminals to sets of first stage output terminals in one of a plurality of patterns including adjacent spacing, alternate spacing and multiple spacing.

19. Apparatus for varying the granularity of interpolation between the amplitudes of a plurality of input signals comprising:
   (a) a source of electrical input signals representing values of the function at relatively widely spaced intervals of a variable of the function,
   (b) a multi-stage interpolator including:
      (1) a first stage having input terminals for receiving input signals from said source and a plurality of output terminals for providing signals representative of intermediate values of the function,
      (2) and a second stage having input terminals and a plurality of output terminals,
   (c) an output circuit,
   (d) pulse operated means for successively connecting said second stage output terminals to said output circuit in repeated cycles of operation,
   (e) means for connecting the input terminals of said second stage interpolator with output terminals of said first stage interpolator,
   (f) and means rendered effective on each cycle of operation of said pulse operated means and responsive to the difference between adjacent values of the function as measured by the input signals associated therewith to cause said connecting means to connect said second stage input terminals to a different group of first stage output terminals within one of a plurality of patterns thereof including adjacent spacing, alternate spacing and multi-spacing.

20. Apparatus for producing signals suitable to control the displacement of a machine element comprising:
   (a) a source of electrical input signals representing values of a function at relatively widely spaced intervals of a variable of the function,
   (b) interpolating means having a plurality of input terminals for receiving signals from said source and a greater number of output terminals for producing output signals which are representative of intermediate values of the function,
   (c) an output conductor,
   (d) means for selectively connecting said output terminals to said output conductor,
   (e) means for controlling the operation of said connecting means so as to successively connect said output terminals to said output conductor in a prearranged sequence,
   (f) means for providing a pair of feed rate signals each representative of the desired rate of displacement of said element between two successive intervals of the function,
   (g) means for governing the rate of operation of said controlling means in accordance with one of said feed rate signals,
   (h) and means for smoothly shifting the control of the rate of operation of said controlling means from said one feed rate signal to the other feed rate signal.

21. The apparatus of claim 20 wherein said shifting means includes:
   (a) an impedance element having a pair of end terminals,
   (b) means to connect one feed rate signal to one end terminal and the other feed rate signal to the other end terminal,
   (c) a wiper contact movable on said impedance element and in electrical circuit with said governing means,
   (d) and means for moving said contact across said impedance element from one end terminal to the other end terminal at a preset rate.

22. The apparatus of claim 21 wherein the moving means includes:
   (a) a reversible constant speed motor,
   (b) means for selectively reversing said motor,
   (c) and a pair of spaced stop members adapted to stall said motor when said wiper contact is connected directly to a feed rate signal on said impedance element.

23. Apparatus for continuously controlling displacement of a machine element in response to values of a function at relatively widely spaced intervals of a variable of the function comprising:
   (a) a source of electrical input signal representing coordinate values of the function in a plurality of dimensions at each of said intervals,
   (b) interpolator means associated with each dimension of the function, each interpolator means including
      (1) a pair of bridges for receiving a plurality of said input signals and for producing therefrom a greater number of output signals representative of intermediate values of the function,
   (c) means associated with each of said interpolator means for receiving said output signals and causing said element to be displaced in response thereto,
   (d) means associated with each of said bridges for producing a control signal which is representative of the spacing between the intermediate values of the function as produced by the bridge,
   (e) means for serially combining the control signals of each pair of bridges to form a composite signal therefrom,
   (f) pulse operated means for determining the rate at which said output signals are delivered to said receiving means,
   (g) and means for delivering pulses to said pulse operated means at a rate inversely proportional to the spacing between said intermediate values of the function as represented by the vectorial sum of the composite signals for each dimension of the function to thereby maintain the rate of movement of said element constant regardless of the spacing between said intermediate values of the function.

24. Apparatus for continuously controlling the displacement of a machine element in response to an input function comprising:
(a) a source of electrical input signals representing values of the function at relatively widely spaced intervals of a variable of a function,
(b) a multi-stage interpolator having:
  (1) a first stage provided with a plurality of input terminals for receiving input signals from said source and a greater number of output terminals for producing signals representative of intermediate values of the function,
  (2) and a second stage having a fewer number of input terminals than the output terminals of said first stage and a greater number of output terminals than it has input terminals,
(c) an output circuit,
(d) pulse operated means for connecting said second stage output terminals to said output circuit in repeated cycles of operation,
(e) means for connecting the input terminals of said second stage with output terminals of said first stage,
(f) and a counting ring circuit operating said connecting means and connected with said pulse operated means for advancement thereby on each cycle of operation thereof to connect successive groups of first stage output terminals with said second stage input terminals during repeated cycling of said pulse operated means.

References Cited by the Examiner
UNITED STATES PATENTS

| | | | |
|---|---|---|---|
| 2,913,179 | 11/1959 | Gordon | 235—164 |
| 2,928,604 | 3/1960 | Dudman et al. | 235—197 |
| 3,201,572 | 8/1965 | Yetter | 235—151 |

MALCOLM A. MORRISON, *Primary Examiner.*

D. W. COOK, K. W. DOBYNS, E. RONEY,
*Assistant Examiners.*